(12) United States Patent
Wu et al.

(10) Patent No.: US 10,877,683 B2
(45) Date of Patent: Dec. 29, 2020

(54) TIERED STORAGE OPTIMIZATION AND MIGRATION

(71) Applicant: International Business Machines Corporation, Armonk, NY (US)

(72) Inventors: Zhang Wu, Shanghai (CN); Chen Geng, Shanghai (CN); Ling Chen, Shanghai (CN); Hui Wang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/379,068

(22) Filed: Apr. 9, 2019

(65) Prior Publication Data

US 2020/0326871 A1 Oct. 15, 2020

(51) Int. Cl.
G06F 3/06 (2006.01)

(52) U.S. Cl.
CPC .......... *G06F 3/0647* (2013.01); *G06F 3/0604* (2013.01); *G06F 3/0679* (2013.01)

(58) Field of Classification Search
CPC ..... G06F 3/0647; G06F 3/0604; G06F 3/0679
USPC ................................. 711/103, 154
See application file for complete search history.

(56) References Cited

U.S. PATENT DOCUMENTS

| | | | |
|---|---|---|---|
| 8,239,584 B1 | 8/2012 | Rabe | |
| 8,554,918 B1 | 10/2013 | Douglis | |
| 10,496,315 B1* | 12/2019 | Niu | ...................... G06F 12/0246 |
| 2007/0271413 A1* | 11/2007 | Fujibayashi | .......... G06F 3/0685 711/112 |
| 2008/0222644 A1* | 9/2008 | Richards | ............... G06F 3/0683 718/104 |
| 2011/0271071 A1* | 11/2011 | Nakatogawa | ......... G06F 3/0685 711/165 |
| 2012/0166749 A1 | 6/2012 | Eleftheriou | |

(Continued)

FOREIGN PATENT DOCUMENTS

| | | |
|---|---|---|
| CN | 103218173 A | 7/2013 |
| CN | 102648457 B | 7/2015 |

OTHER PUBLICATIONS

Luo et al., "WARM: Improving NAND Flash Memory Lifetime with Write-hotness Aware Retention Management", 978-1-4673-7619-8/15 © 2015 IEEE, 14 pages.

(Continued)

*Primary Examiner* — Than Nguyen
(74) *Attorney, Agent, or Firm* — Christopher M. Pignato

(57) ABSTRACT

Systems, methods, and computer program products for automating the management of a tiered storage system, which improves the service life and costs of the flash-based storage devices that comprise the storage system. The systems, methods and program products utilize time series learning models to predict the write frequency of each data block for the next cycle of time. Using the write frequency predictions, management of the tiered flash-based storage system can automatically organize and migrate stored data based on storage costs, migration costs and frequency in which the data is accessed. Data that is more frequently accessed and updated is migrated to high-end flash-based storage devices, which are able to endure a greater number of program/erase cycles, while less frequently accessed data is migrated to less expensive, low-end flash-based storage devices, that have a lower maximum number program/erase cycles.

17 Claims, 11 Drawing Sheets

(56) References Cited

U.S. PATENT DOCUMENTS

| | | |
|---|---|---|
| 2013/0159648 A1 | 6/2013 | Anglin |
| 2013/0159998 A1 | 6/2013 | Cawlfield |
| 2015/0205528 A1* | 7/2015 | Hyde, II .............. G06F 3/0611 |
| | | 711/114 |
| 2015/0355837 A1 | 12/2015 | Bish |
| 2017/0262216 A1 | 9/2017 | Polkovnikov |

OTHER PUBLICATIONS

Mai et al., "Dynamic Data Migration in Hybrid Main Memories for In-Memory Big Data Storage", © 2014 ETRI Journal, vol. 36, No. 6, Dec. 2014, 11 pages, <http://dx.doi.org/10.4218/etrij.14.0114.0012>.

\* cited by examiner

TIERED STORAGE OPTIMIZATION AND MIGRATION

TECHNICAL FIELD

The present disclosure relates generally to the field of data storage and more specifically to data migration between data storage devices.

BACKGROUND

Flash storage memory is a form of electrically erasable, programmable read-only memory. Flash memory differs from EEPROM in the way that flash memory erases the data stored. Flash erases whole blocks of data at a time, rather than bit-by-bit the way EEPROM erases data. A block of data stored on a flash memory chip must be erased before new data can be written. Flash-based storage systems are composed of memory chips and a flash controller. The memory chips are responsible for storing data, while the controller manages accesses to the storage space on the memory unit. Flash memory architecture includes a memory array stacked with a large number of flash cells. A basic flash memory cell consists of a storage transistor with a control gate and a floating gate, which is insulated from the rest of the transistor by a thin dielectric material or oxide layer. Flash storage is nonvolatile memory and does not require power to preserve the data stored on the memory chip. A system comprising the flash storage can be turned off or lose power and as a result, the data stored on the flash storage will not be lost. Flash storage is considered solid-state storage and stores data using a charge on a capacitor to represent a bit.

SUMMARY

A first embodiment of the present disclosure provides a computer-implemented method comprising the steps of: recording, time series data describing each write frequency of each hot data block stored by a tiered flash-based storage system comprising a high-end flash-based storage device and a low-end flash-based storage device; generating a time series prediction model using the time series data; generating a write frequency prediction of each data block of the tiered flash-based storage system for a time period describing a future write cycle; calculating a cost for maintaining hot data stored on the low-end flash-based storage device and cold data stored on the high-end flash-based storage device, on the tiered flash-based storage system; calculating a cost for migrating the hot data from the low-end flash-based storage device to the high-end flash-based storage device and migrating the cold data of the high-end flash-based storage device to the low-end flash-based storage device; determining the cost for migrating is less than the cost for maintaining; and migrating hot data from the low-end flash-based storage device to the high-end flash-based storage device and cold data from the high-end flash-based storage device to the low-end flash-based storage device.

A second embodiment of the present disclosure provides a computer system comprising at least one processor; a tiered flash-based storage system coupled to the at least one processor, the tiered flash-based storage system comprising a high-end flash-based storage device and a one low-end flash-based storage device; a computer-readable storage media coupled to the at least one processor, wherein the computer readable storage media contains program instructions executing a computer-implemented method comprising the steps of: recording time series data describing a write frequency of each hot data block stored by the tiered flash-based storage system, generating a time series prediction model using the time series data, generating a write frequency prediction of each data block of the tiered flash-based storage system for a time period describing a future write cycle, calculating a cost for maintaining hot data stored on the low-end flash-based storage device and cold data stored on the high-end flash-based storage device, in the tiered flash-based storage system, calculating a cost for migrating the hot data from the low-end flash-based storage device to the high-end flash-based storage device and migrating the cold data of the high-end flash-based storage device to the low-end flash-based storage device, determining the cost for migrating is less than the cost for maintaining, and migrating hot data from the low-end flash-based storage device to the high-end flash-based storage device and cold data from the high-end flash-based storage device to the low-end flash-based storage device.

A third embodiment of the present disclosure provides a computer program product comprising: one or more computer readable storage media having computer-readable program instructions stored on the one or more computer readable storage media, said program instructions execute a computer-implemented method comprising the steps of: recording, time series data describing a write frequency of each hot data block stored by a tiered flash-based storage system comprising a high-end flash-based storage device and a low-end flash-based storage device, generating a time series prediction model using the time series data, generating a write frequency prediction of each data block of the tiered flash-based storage system for a time period describing a future write cycle, calculating a cost for maintaining hot data stored on the low-end flash-based storage device and cold data stored on the high-end flash-based storage device, in the tiered flash-based storage system, calculating a cost for migrating the hot data from the low-end flash-based storage device to the high-end flash-based storage device and migrating the cold data of the high-end flash-based storage device to the low-end flash-based storage device, determining the cost for migrating is less than the cost for maintaining, and migrating hot data from the low-end flash-based storage device to the high-end flash-based storage device and cold data from the high-end flash-based storage device to the low-end flash-based storage device.

DETAILED DESCRIPTION

Overview

Figure 1A:
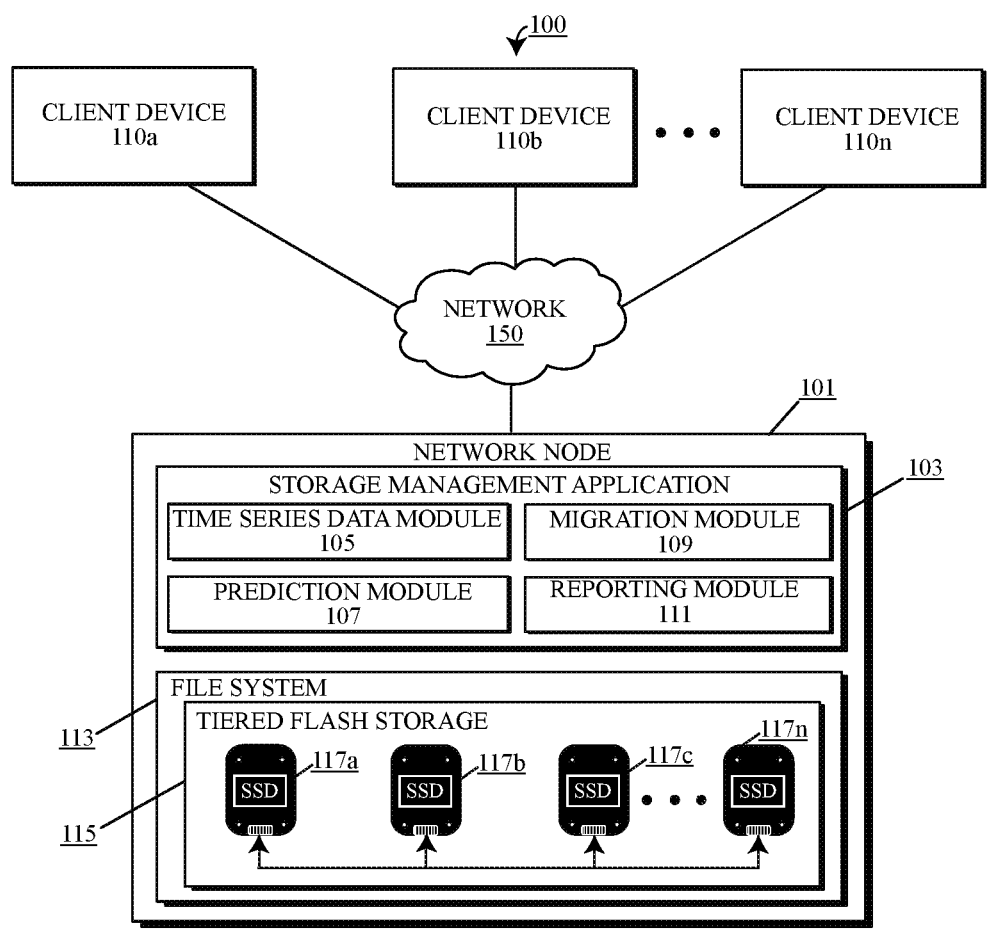
FIG. 1a depicts a functional block diagram describing an embodiment of a computing environment in accordance with the present disclosure.
Figure 1B:
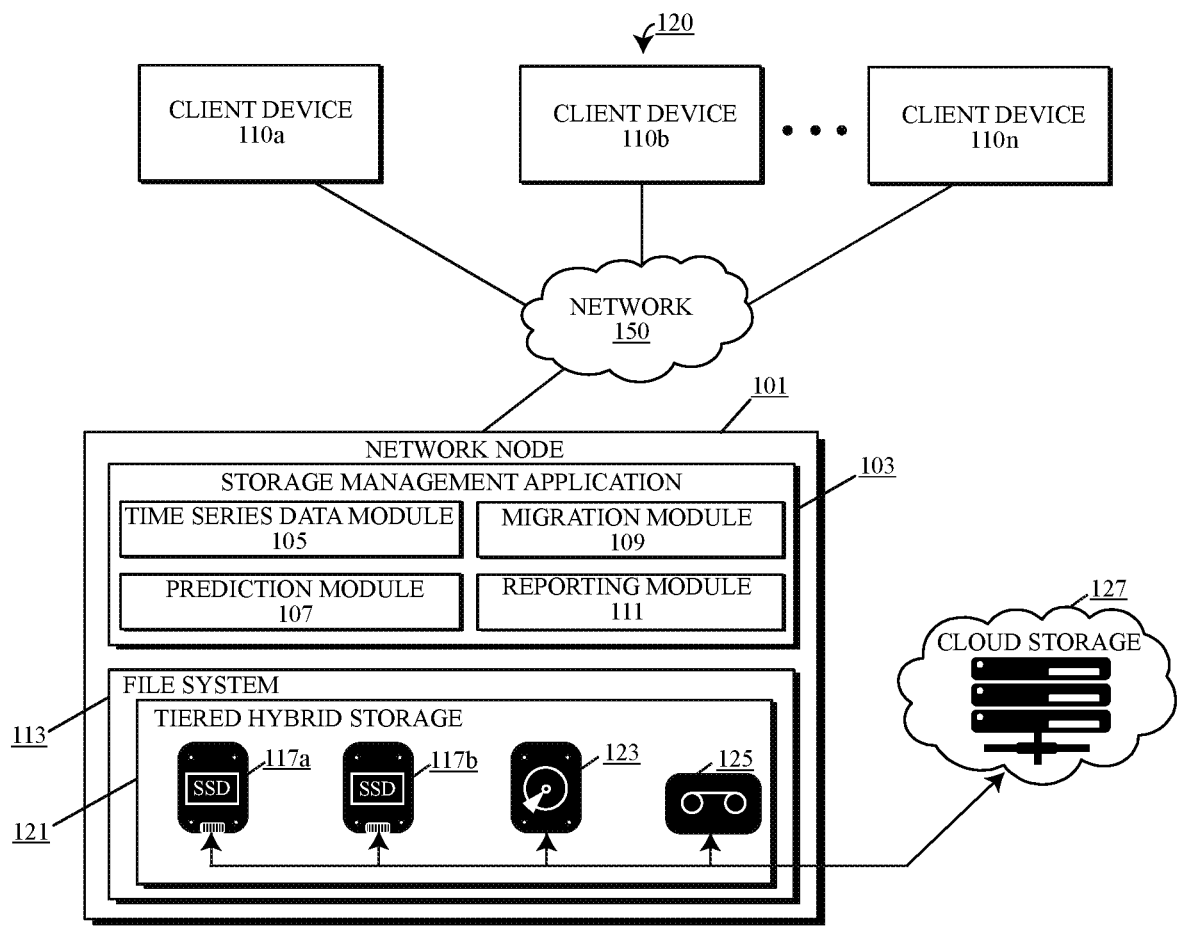
FIG. 1b depicts a functional block diagram describing an alternative embodiment of a computing environment in accordance with the present disclosure.

Flash-based storage devices are designed to meet a high standard of use and are consistently used in fields that may require reliability and a large amount of input and output. For example, enterprise networks, high tech services, military, scientific and medical fields, etc. Components of flash storage solutions do not contain moving parts. The lack of moving parts reduces power consumption, and significantly reduces access times. Embodiments of the present disclosure recognize that when implementing a flash-based storage system comprising one or more flash-based storage devices or a hybrid of storage solution, two main characteristics of the storage devices that may be considered are: 1) the service life of the storage device(s); and 2) the cost of the storage devices. Embodiments of the present disclosure automate storage management of tiered storage systems comprising flash-based storage devices to improve both the characteristics of service life of the flash-based storage devices and reduce the cost of implementing the flash-based storage, for example a solid state drive (SSD) by optimizing the location of frequently accessed and written data to "high-end" storage devices able to withstand a higher number of program/erase (PE) cycles, while migrating the data less frequently accessed data to less expensive, "low-end" storage devices, that may have a lower number of maximum PE cycles than the high-end storage solutions, but also may cost less than the high-end storage counterpart.

Embodiments of the disclosed systems, methods and computer program products automate the management and migration of data between the various tiers of storage devices that make up a tiered storage system. Management and migration of data may be performed by implementing time series modeling to predict the write frequency of each of the data blocks within the flash-based storage system (and non-flash-based storage in hybrid storage systems) for each interval of time in a time cycle, where writing of data to the data blocks of the storage device is expected to occur. Based on the expected write frequency of the data blocks, data may be migrated (or not) to a storage device best suited for the characteristics of the data's write frequency. Data predicted to be more frequently accessed, written and updated (i.e. "hot data") may be determined to be best suited for storage on a high-end storage device, which can endure a higher maximum number of writes, whereas "cold data" (i.e. data accessed, written and updated less frequently) may be stored on a low-end storage device. For example, hot data could be any type of data written to the data blocks of a storage device during a write cycle, while cold data would be data that was not written to, accessed or updated during the same write cycle. Some data may be considered hotter than others. For instance, data written to the blocks of a storage device 15 times during a write cycle would be considered hotter than data written to a storage device 5 times, which is hotter than data written to a block 1 time. Conversely, the "coldness" of cold data may similarly be compared. Cold data that has not been accessed or written to 5 times in a month may be considered not as cold as data written to a block of a storage device 5 times in a year, while cold data that has not been accessed on a storage device in several years may be considered even colder.

By successfully predicting the write frequency of data blocks within each storage device, embodiments of the present disclosure can successfully sort and evaluate the most frequently accessed hot data currently maintained on low-end storage as well as the cold data least actively accessed on high-end storage and determine whether to migrate the hot and/or cold data ahead of the peak of the next writing cycle (i.e. during a cold point, wherein the least amount of write activity is anticipated to occur). By migrating data to a more appropriate storage device based on the write frequency, reduction to the overall cost for storage while maintaining storage performance can be achieved because data stored to low-end storage experiences a lower write frequency, reducing the overall number of PE cycles, increasing the service life of the low-end storage, and less data considered to be "cold" is stored to high-end storage, therefore less high-end storage may be required by a computer system configuration to achieve a desired level of performance.

System for Automating Flash Storage Data Migration

Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure. A more complete understanding of the present embodiments and advantages thereof may be acquired by referring to the following description taken in conjunction with the accompanying drawings, in which like reference numbers indicate like features.

As a preface to the detailed description, it should be noted that, as used in this specification and the appended claims, the singular forms "a", "an" and "the" include plural referents, unless the context clearly dictates otherwise.

Referring to the drawings, FIGS. 1a-4b depict diagrams of a computing environment 100, 120, 130, 140, 200 capable of implementing the automation of data migration between one or more flash-based storage devices 117a, 117b, 117c . . . 117n (referred to generally herein as a "storage device 117") and/or non-flash-based storage devices, for example hard drives 123, tape 125 and cloud storage 127 (referred herein collectively as "non-flash-based storage devices 123, 125, 127"). Embodiments of computing environment 100, 120, 130, 140, 200 may include a plurality of computer systems and devices interconnected via a computer network 150 and/or a storage network 141. The interconnected computer systems and devices may include one or more network nodes 101a, 101b . . . 101n (referred to individually and generally herein as "network node 101"), client devices 110a, 110b . . . 110n (referred to generally herein as "client device 110"), and/or network storage devices 131a, 131b . . . 131n (referred to singularly or generally as "network storage device 131").

Figure 7:
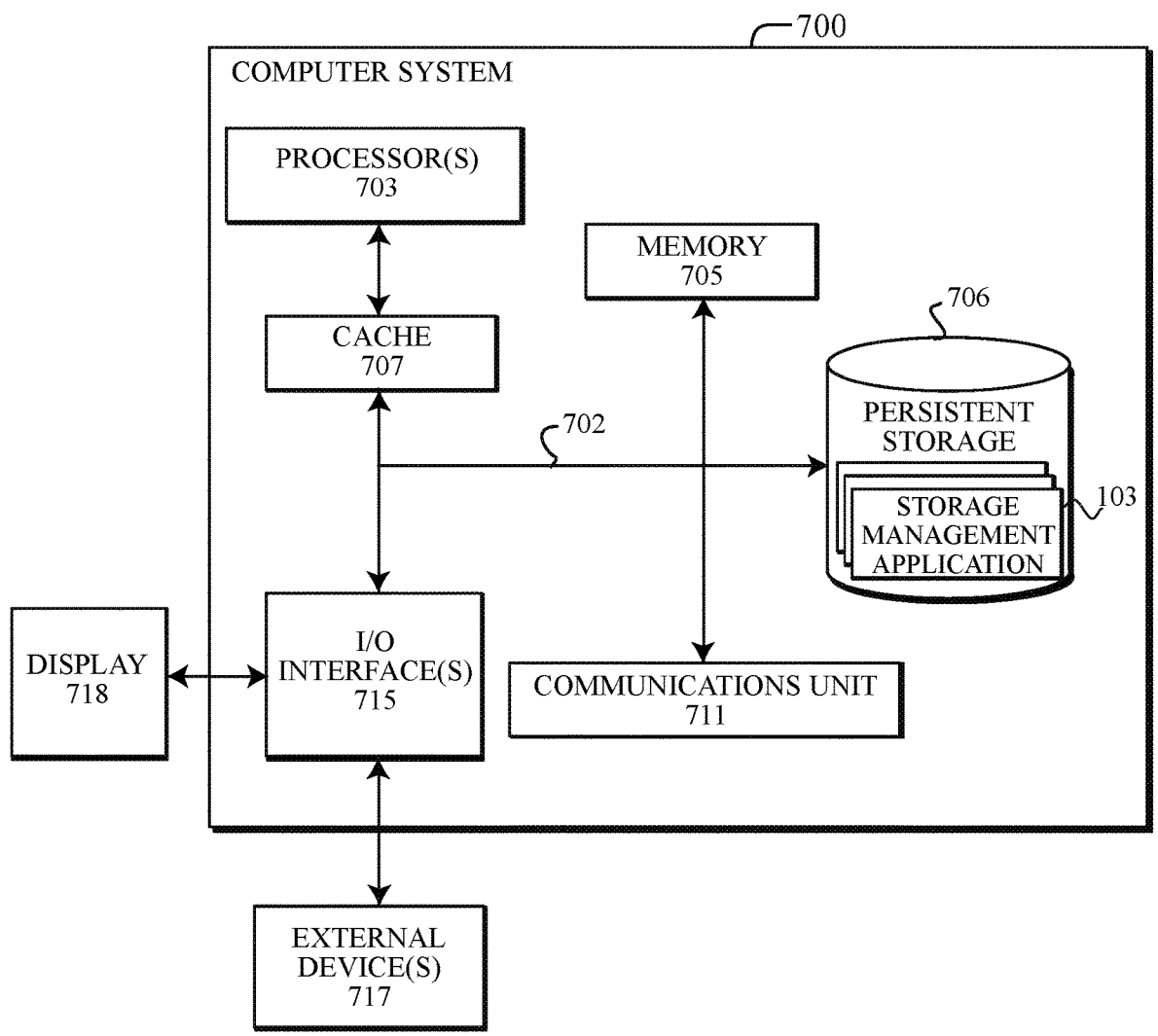
FIG. 7 depicts an embodiment of a block diagram of internal and external components of a computer system in accordance with the embodiments of the present disclosure.

Network node 101, client device 110, network storage device 131, and other network accessible systems such as one or more computer systems 700, may each be a specialized computer system comprising specialized configurations of hardware, software or a combination thereof, as shown and described in FIGS. 1a-4b of the present disclosure and in embodiments described herein. Embodiments of the network node 101, client device 110, network storage device 131 and other network accessible systems, may not only comprise the elements of the systems and devices depicted in FIGS. 1a-3, but may also incorporate one or more elements of a computer system 700, as shown in FIG. 7 and described in the COMPUTER SYSTEM section below. One or more components of the computer system 700 may be integrated into each of the specialized computer systems of computing environment 100, 120, 130, 140, 200, including the integration of one or more processor(s) 703, communications fabric 702, memory 705, persistent storage 706, cache 707, communications unit 711, I/O interface(s) 715, external device(s) and/or human-readable display(s) 718.

Embodiments of the network nodes 101, client devices 110, network storage devices 131, and other network accessible systems, may be desktop computers, laptop computers, tablet computers, smartphones, network enabled IOT devices, wearable computing devices, servers, or any other type of computer system known by persons skilled in the art. In some embodiments, network nodes 101, client devices 110, network storage devices 131, and other network accessible systems, may represent computer systems utilizing clustered computers and components to act as a single pool of seamless resources when accessed through network 150 or storage network 141. For example, such embodiments may be used in a data center, cloud computing environment 200, storage area network (SAN) such as the storage network 141 comprising a network storage pool 143, and network attached storage (NAS) applications. In certain embodiments, network nodes 101, client devices 110, network storage device 131, and other network accessible systems may represent virtual machines provisioned by a host computer on the network 150 or storage network 141. For example, a network node 101 hosting a plurality of virtual machines accessing the storage management application 103 being hosted by the network node 101, a network storage device 131 and/or a network storage pool 143 connected to the network node 101. In general, network nodes 101, client devices 110, network storage devices 131, and other network accessible systems may be representative of any electronic devices, or combination of electronic devices, capable of executing machine-readable program instructions, as described in greater detail with regard to FIGS. 5-6b below.

Embodiments of the network nodes 101, client devices 110, network storage devices 131, and other network accessible systems, may each be connected and placed into communication with one another over a computer network 150 and/or storage network 141. Embodiments of the computer network 150 and/or storage network 141 may be constructed using wired, wireless or fiber optic connections. As shown in the exemplary embodiments, network nodes 101, client devices 110, network storage device 131 and other network accessible systems may connect and communicate over the network 150 and/or storage network 141 using a communications unit 711, such as a network interface controller or other network communication hardware. Embodiments of the communications unit 711 may implement specialized electronic circuitry allowing for communication using a specific physical layer and a data link layer standard. For example, Ethernet, Fiber channel, Wi-Fi or Token Ring. Communications unit 711 may further allow for a full network protocol stack, enabling communication over network 150 or storage network 141 to the group of network nodes 101, client devices 110, computer systems 700 or other computing hardware devices linked together through the communication channels. The network 150 and/or storage network 141 may facilitate communication and resource sharing among the network nodes 101, client devices 110, network storage devices 131, and other network accessible systems connected to the network 150 and/or storage network 141. Examples of network 150 and/or storage network 141 may include a local area network (LAN), home area network (HAN), wide area network (WAN), back bone networks (BBN), peer to peer networks (P2P), storage area network (SAN), campus networks, enterprise networks, the Internet, cloud computing networks and any other network known by a person skilled in the art.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. A cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment 200 is service oriented with a focus on statelessness, low coupling, modularity, and semantic interoperability. At the heart of cloud computing is an infrastructure that includes a network of interconnected nodes.

Figure 2:
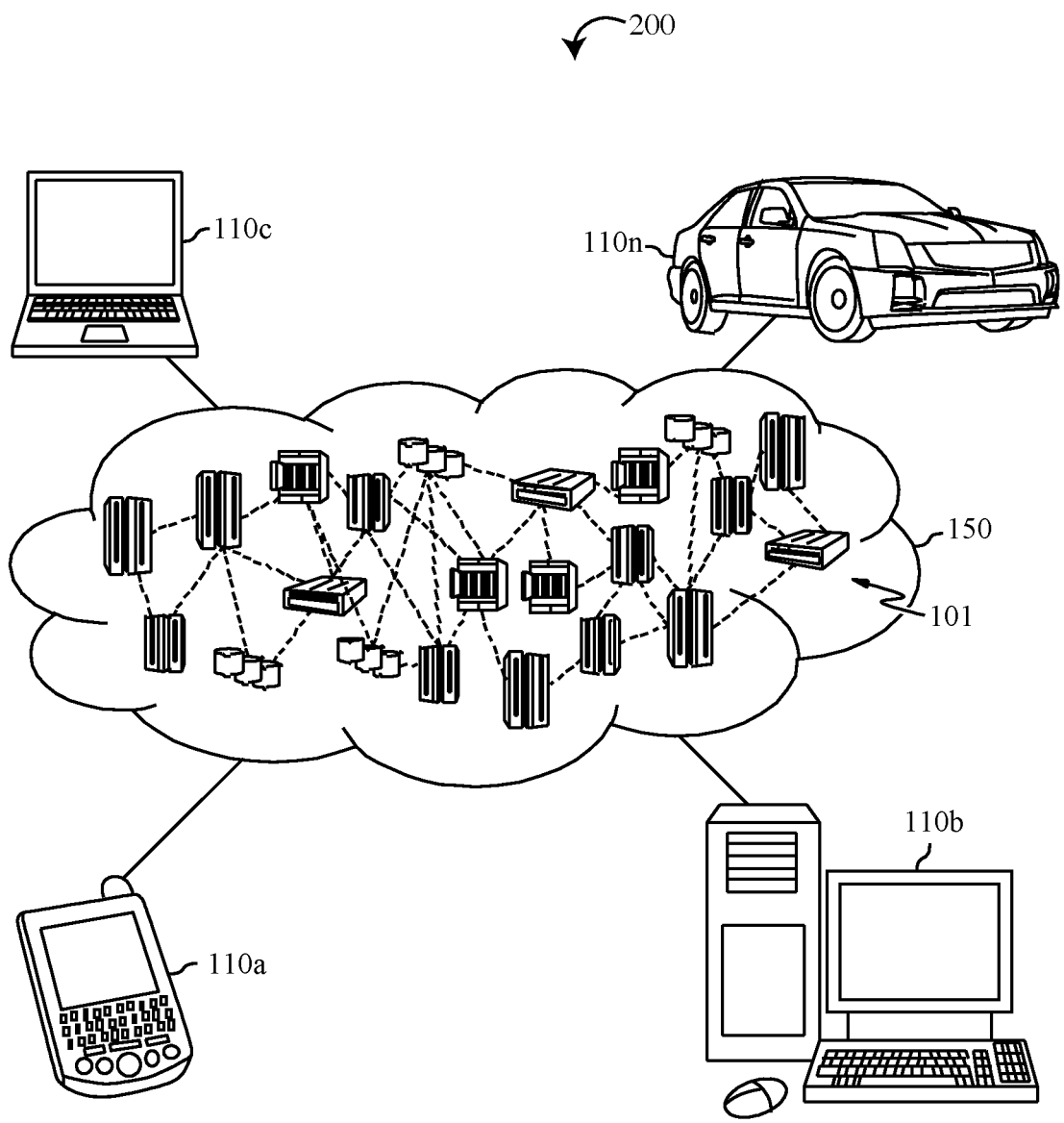
FIG. 2 depicts an embodiment of a cloud computing environment in accordance with the present disclosure.

Referring to the drawings, FIG. 2 is an illustrative example of a cloud computing environment 200. As shown, cloud computing environment 200 includes one or more network nodes 101 with which client devices 110 operated by cloud consumers may communicate, such as, for example, smartphone or cellular telephone 110a, desktop computer 110b, laptop computer 110c, and/or any other unconventional computing or IOT device, such as an automobile computer system 110n, sensor device, household appliance, etc. Network nodes 101 may communicate with one another and may be grouped (not shown) physically or virtually, in one or more networks, such as Private, Community, Public, or Hybrid clouds as described herein, or a combination thereof. This may allow cloud computing environment 200 to offer infrastructure, platforms and/or software as services for which a cloud consumer does not need to maintain resources locally on a client device 110. It is understood that the types of client devices 110 shown in FIG. 2 are intended to be illustrative only and that network nodes 101 of the cloud computing environment 200 can communicate with any type of computerized device over any type of network and/or network addressable connection (e.g., using a web browser).

Figure 3:
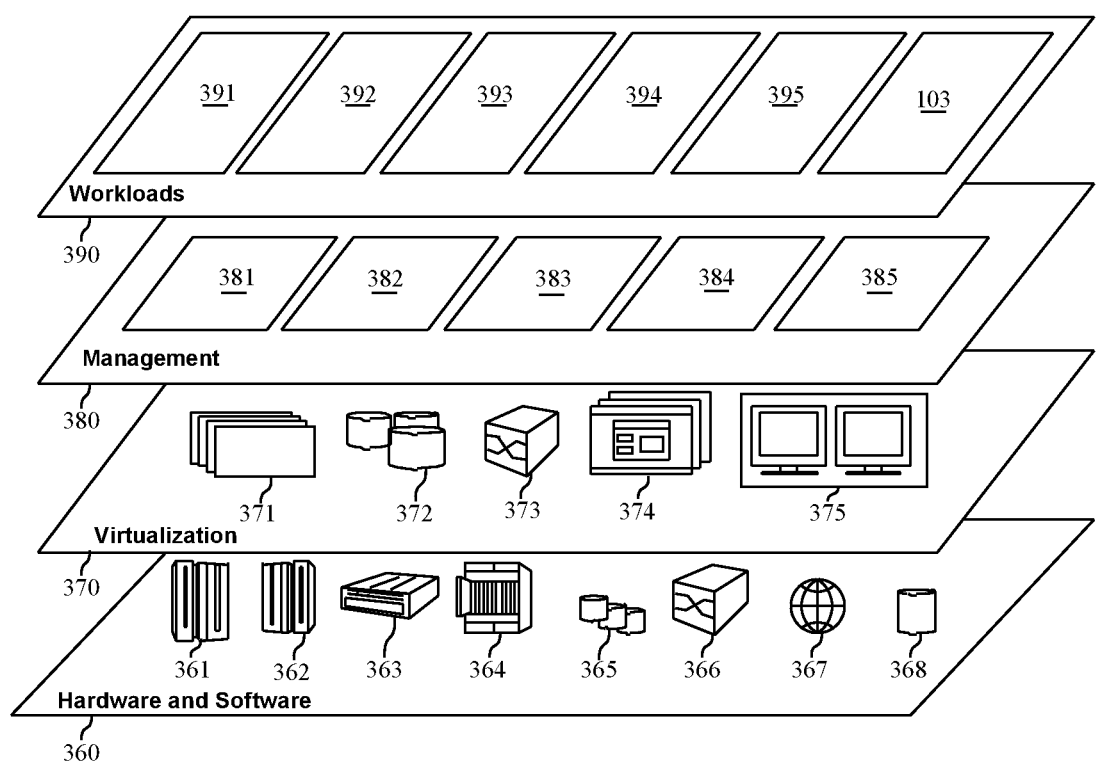
FIG. 3 depicts an embodiment of abstraction model layers of a cloud computing environment in accordance with the present disclosure.

Referring now to FIG. 3, a set of functional abstraction layers provided by cloud computing environment 200 is shown. It should be understood in advance that the components, layers, and functions shown in FIG. 3 are intended to be illustrative only and embodiments of the invention are not limited thereto. As depicted, the following layers and corresponding functions are provided:

Hardware and software layer 360 includes hardware and software components. Examples of hardware components include: mainframes 361; RISC (Reduced Instruction Set Computer) architecture-based servers 362; servers 363; blade servers 364; storage devices 365; and networks and networking components 366. In some embodiments, software components include network application server software 367 and database software 368.

Virtualization layer 370 provides an abstraction layer from which the following examples of virtual entities may be provided: virtual servers 371; virtual storage 372; virtual networks 373, including virtual private networks; virtual applications and operating systems 374; and virtual clients 375.

In one example, management layer 380 may provide the functions described below. Resource provisioning 381 provides dynamic procurement of computing resources and other resources that are utilized to perform tasks within the cloud computing environment 200. Metering and pricing 382 provide cost tracking as resources are utilized within the cloud computing environment 200, and billing or invoicing for consumption of these resources. In one example, these resources can include application software licenses. Security provides identity verification for cloud consumers and tasks, as well as protection for data and other resources. User portal 383 provides access to the cloud computing environment 200 for cloud consumers and system administrators. Service level management 384 provides cloud computing resource allocation and management such that required service levels are met. Service Level Agreement (SLA) planning and fulfillment 385 provide pre-arrangement for, and procurement of, cloud computing resources for which a future requirement is anticipated in accordance with an SLA.

Workloads layer 390 provides examples of functionality for which the cloud computing environment 200 may be utilized. Examples of workloads and functions which may be provided from this layer include: machine learning models 391 (such as time series prediction modeling, described below); software development and lifecycle management 392; data curation 393; data analytics processing 394; report processing 395 and storage management application 103.

Embodiments of the computing environments 100, 120, 130, 140, 200 may include one or more network nodes 101 or any other type of computer system 700 capable of performing one or more tasks or functions associated with automating the management of storage devices and storage space within the computing environment 100, 120, 130, 140, 200. For example, automated migration of data stored by one or more flash-based storage devices 117 and/or non-flash-based storage devices 123, 125, 127. Embodiments of a network node 101 may refer to a computer, device or a program that may be dedicated to managing network 150 and/or storage network 141 resources, including, but not limited to the storage space for the network 150 and/or storage network 141. Embodiments of a network node 101 may be a server computer which may include a computer program or application that provides a service to each of the client devices 110, computer systems 700 or computer programs (and users thereof) connecting to the network node 101 via a network 150 or storage network 141. Examples of server computers may include a web server, application server, mail server, virtual server, file server, etc.

Embodiments of the computing environment 100, 120, 130, 140 may include a file system 113 that may be accessible to one or more of the client devices 110 placed in communication with one or more of the network nodes 101. The file system 113 may organize the storage, lookup and retrieval of data contained within each of the storage devices 117, 123, 125, 127 and may act similar to an index. Embodiments of the file system 113 may specify conventions for naming files, including the maximum number of characters in a name, characters that can be used and how long each file name suffix can be. Embodiments of a file system 113 may contain information describing the size of each file, file attributes, location and hierarchy within a directory. In some embodiments, metadata of the file system 113 can identify free data blocks of available storage space within each storage devices 117, 123, 125, 127 of the file system 113 and describe how much overall space is available for storage. The location and configuration of the storage devices 117, 123, 125, 127 within the file system 113 may vary depending on the embodiment of the computer environment 100, 120, 130, 140, 200. For example, as shown in the embodiment of computer environment 100, the file system 113 can be local to the network node 101 and include a tiered flash-based storage system 115 comprising a plurality of flash-based storage devices 117a, 117b, 117c, 117n. Similarly, in computing environment 120, the file system 113 remains a part of network node 101, however, in this embodiment, storage devices of the file system 113 include a tiered hybrid storage system 121 comprising a plurality of flash-based storage devices 117a, 117b as well as one or more non-flash-based storage devices, such as a hard drive 123, tape 125 and cloud storage 127.

Figure 1C:
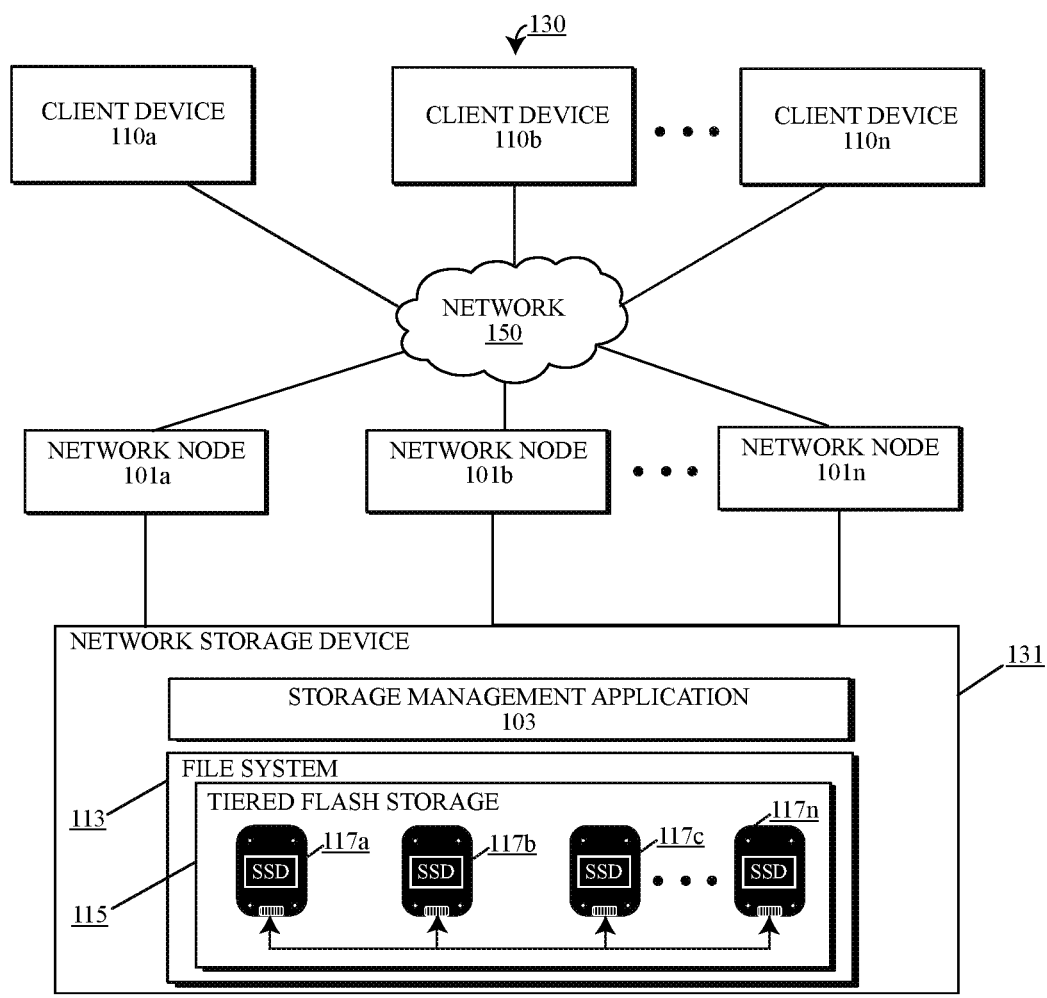
FIG. 1c depicts a functional block diagram describing a second alternative embodiment of a computing environment in accordance with the present disclosure.

In some embodiments, the file system 113 may be shared with a plurality of network nodes 101. As shown in the exemplary computing environment 130 embodiment of FIG. 1c, the file system 113 may be integrated into a network storage device 131 or any other type of network accessible computer system 700. The file system 113 and the storage devices 117, 123, 125, 127 of file system 113 may be accessible to each of the one or more network nodes 101a, 101b, 101n of a network 150 that are able to connect to the network storage device 131. Embodiments of a file system 113 that may be shared amongst a plurality of network nodes 101 may be referred to as a "shared file system." While embodiments of the file system 113 in FIG. 1c are depicted as including a tiered flash-based storage system 115 that are accessible to the network nodes 101 and client devices 110 as part of a network storage device 131, in some embodiments, the storage devices 117, 123, 125, 127 of file system 113 being maintained as part of the network storage device 131 may be a tiered hybrid storage system 121 similar to the tiered hybrid storage system 121 of FIG. 1b.

In some embodiments of the computing environment 100, 120, 130, 140, 200 a plurality of network storage devices 131a, 131b, 131n, each containing a file system 113a, 113b, 113n may be part of a network storage pool 143 of storage devices 117, 123, 125, 127 operating as part of a storage network 141. As exemplified in computing environment 140, in some embodiments, the network storage pool 143 may comprise a plurality of network storage devices 131, each comprising a separate file system 113a, 113b, 113n and a tiered flash-based storage system 115a, 115b, 115n or a hybrid storage system 121 (not shown). Client devices 110 accessing one or more network nodes 101 may seamlessly access the files stored on the network storage pool 143 via one or more network nodes 101, and a user of each client device 110 may be unaware that the network storage pool 143 is a comprised of a plurality of network storage devices 131, each including a separate tiered flash-based storage system 115 being managed by the storage network 141 maintaining the network storage pool 143.

In some alternative embodiments, each network storage device 131 of the network storage pool 143 may comprise one or more flash-based storage devices 117 and/or non-flash-based storage devices 123, 125, 127. Instead of a tiered storage system 115, 121 being fully contained by a single network storage device 131 as shown in computing environments 130, 140, the tiered storage system 115, 121 may be decentralized across the network storage pool 143. In other words, each network storage device 131 may include storage device(s) 117, 123, 125, 127 comprising one or more of the tiers of the tiered storage system 115, 121. For example, network storage device 131a comprises the high-end tier of flash-based storage device(s) 117a, whereas network storage device 131b comprise the low-end tier of the flash-based storage device(s) 117b and network storage device 131n comprises the lowest tier of the tiered storage system, and includes non-flash-based storage devices such as hard drive(s) 123, tape(s) 125 and/or cloud storage 127.

Embodiments of a tiered storage system 115, 121, whether a flash-based storage system 115 or a hybrid storage system 121, the tiered storage system 115, 121 may comprise two or more storage devices 117, 123, 125, 127. In the embodiment of FIG. 1a, the file system 113 may include a tiered flash-based storage system 115 which may be comprised entirely of flash-based storage devices 117. For example, flash-based storage devices 117a, 117b, 117c, 117n as shown in the drawings. The embodiments of the flash-based storage devices 117 within the tiered flash-based storage system 115 may comprise various combinations of high-end flash-based storage device(s) and low-end flash-based storage device(s) in quantities that may be desired to fulfill one or more configurations of the tiered flash-based storage system 115. While the embodiment of FIG. 1a depicts four flash-based storage devices 117, any number of a plurality of flash-based storage devices 117 may be integrated into the tiered flash-based storage system 115. For example, a tiered flash-based storage system 115 could include two flash-based storage devices 117 or could include hundreds or more flash-based storage devices 117. Similarly, a hybrid storage system 121 may comprise at least one flash-based storage device 117 and at least one non-flash-based storage device 123, 125, 127, however any combination of a plurality of flash-based and non-flash based storage devices may be utilized by a computer environment 100, 120, 130, 140, 200 having a hybrid storage system 121.

Regardless of whether a file system 113 includes a tiered flash-based storage system 115 or a tiered hybrid storage system 121, the storage devices 117, 123, 125, 127 of the respective storage systems 115, 121 may be organized into a hierarchy of tiers. Each tiered storage system 115, 121 may include a combination of high-end storage devices and low-end storage devices. The term "high-end" or "low-end"

may be used as a comparative term between two different storage devices 117, 123, 125, 127 within a configuration of a computing environment 100, 120, 130, 140, 200. A high-end storage device may refer to a storage device 117, 123, 125, 127 that may have a longer service life, a higher maximum number of PE cycles and/or increased cost per unit of storage compared with low-end storage device. There are multiple different embodiments of flash-based storage devices 117. Table 1 below describes the differences between single-level cell (SLC), multi-level cell (MLC) and triple-level cell (TLC) flash-based storage devices 117. Based on the comparison shown below in Table 1, an SLC flash-based storage device 117 such as an SLC solid state drive (SSD) would be considered a high-end flash-based storage device when compared to either an MLC SSD or a TLC SSD. Similarly, if a comparison is made between an MLC SSD and a TLC SSD, the MLC storage device would be considered the "high-end" tier and the TLC would be considered the "low-end" storage device comparatively.

TABLE 1

Types of Flash Storage Devices

|  | SLC | MLC | TLC |
|---|---|---|---|
| Bits Per Cell | 1 | 2 | 3 |
| Max PE Cycles | 50,000 | 3,000 | <1,000 |
| Reliability/ Endurance | Excellent | Very Good | Ok |
| Cost | $$$$ | $$ | $ |

In some embodiments, the service life of high-end and low-end flash-based storage may be compared by calculating the service life of both the high-end flash-based storage device and the low-end flash-based storage device in order to identify one from the other, wherein the high-end flash-based storage device has a greater service life than the low-end flash-based storage device. The formula for calculating the service life of the low-end flash-based storage device may be described as follows:

$$\text{Service Life Low-End storage device} = \frac{PE_{low}}{\frac{\sum_{k=0}^{n} \text{ExpTop}(f(k))}{Num_{lowblocks}}},$$

wherein $PE_{low}$ is a maximum number of PE cycles of the low-end flash-based storage device, $\sum_{k=0}^{n} \text{ExpTop}(f(k))$ is a write frequency sum of the low-end flash-based storage device except for hot data blocks in the low-end flash-based storage device, and $Num_{lowblocks}$ is a total number of data blocks that the low-end flash-based storage device contains.

A similar calculation may be made to calculate the cumulative service life of all the low-end flash-based storage devices within in a particular computing environment 100, 120, 130, 140, 200. The calculation of the service life of all low-end storage flash-based storage devices may be made using the following formula:

$$\text{Service Life All Low-End Storage} = \frac{PE_{low}}{\frac{\sum_{k=0}^{n} f(k)}{Num_{blocks}}},$$

wherein $PE_{low}$ is a maximum number of PE cycles, $\sum_{k=0}^{n} f(k)$ is the write frequency sum of the low-end flash-based storage devices, and $Num_{blocks}$ is the total number of block of the low-end storage.

The service life of the high-end flash-based storage devices may be calculated in a similar manner using the formula described below:

$$\text{Service Life High-End} = \frac{PE_{high}}{\frac{\sum_{k=0}^{n} \text{Top}(f(k))}{Num_{highblocks}}},$$

wherein $PE_{high}$ is a maximum number of PE cycles of the high-end flash-based storage device, $\sum_{k=0}^{n} \text{Top}(f(k))$ is a write frequency sum of the top hot data blocks of high-end flash-based storage device, and $Num_{highblocks}$ is a number of data blocks that the high-end flash-based storage device contains.

Embodiments of the computing environments 100, 120, 130, 140, 200 as depicted in FIGS. 1a-3 may be configured to manage the data stored by the tiered storage system(s) 115, 121 and more specifically, optimize the location of the stored data and automate the migration of data between high-end storage devices and low-end storage devices in a cost-effective manner via a storage management application 103. Embodiments of the storage management application 103 may be loaded into the persistent storage 706 or other computer readable storage media accessible to a network node 101. For example, locally (as shown in FIG. 1a-1b), as part of a network storage device 131 (shown in FIG. 1c), or as a network-accessible application (as shown in FIG. 1d depicting the storage management application 103 operating as a network service of the storage network 141). Embodiments of the storage management application 103 may include one or more processes, services, engines and/or modules specializing in performing one or more specific tasks associated with managing the tiered flash-based storage system 115 and/or tiered hybrid storage system 121 of the file system 113 (or the shared file system 113a, 113b . . . 113n, as shown in FIG. 1d). For example, in the embodiment of the storage management application 103 depicted in FIG. 1a, the storage management application 103 comprises a time series data module 105, prediction module 107, migration module 109 and a reporting module 111.

Figure 1D:
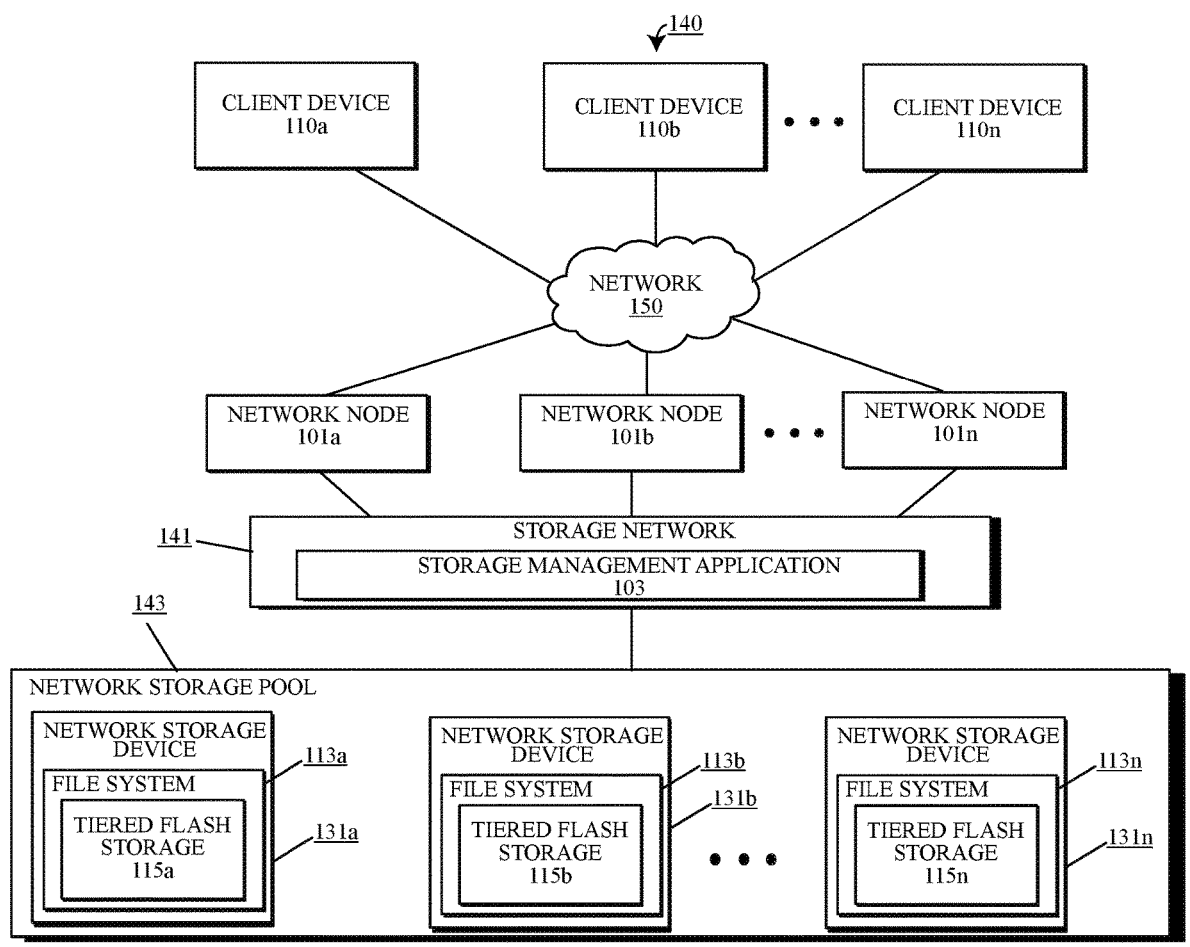
FIG. 1d depicts a functional block diagram describing a third alternative embodiment of a computer environment in accordance with the present disclosure.

The term "module" may refer to a hardware module, a software module, or a module may be a combination of hardware and software resources. A module (whether hardware, software or a combination thereof) may be designed to implement or execute one or more specific tasks, routines or functions. Embodiments of hardware-based modules may include self-contained components such as chipsets, specialized circuitry, one or more memory 705 devices and/or persistent storage 706 devices. A software-based module may be part of a program, program code or linked to program code containing specific programmed instructions loaded into a memory 705 device or persistent storage 706 device of a computer system 700, such as the network node 101, network storage device 131 or as a network accessible application, running in an application layer of the storage network 141 (as shown in FIG. 1d).

Embodiments of the storage management application 103 may comprise a time series data module 105. The time series data module 105 may perform functions or tasks of the storage management application 103 directed toward the collection of time series data describing the data traffic patterns of the computing environment 100, 120, 130, 140, 200, and more specifically the patterns of usage of the tiered file storage systems 115, 121. The collection of time series data describing the data traffic patterns may include data characterizing the dates and times data is accessed, updated, written or erased by one or more tiered storage systems 115, 121. The data traffic patterns of a computing environment 100, 120, 130, 140, 200 may fluctuate dramatically depending on the type of environment, network 150 and use. The data traffic may fluctuate in a periodic manner. For example, in an enterprise business network, the data traffic patterns can indicate much heavier use of the enterprise business network and the tiered storage systems 115, 121 during the weekdays rather than the weekends. Moreover, the time series data collected by the time series data module may further indicate peak usage. For example, an enterprise business network periodically receiving spikes in peak usage at the end of every month during monthly accounting. Embodiments of the storage management application 103 may use the periodic nature of the data traffic observed to identify peak rates of change to the stored data and "cold points" of data storage that represent low rates of change to the stored data (i.e. less writing, updating, and erasing), described in further detail below.

Embodiments of the time series data module 105 may monitor, observe and record the data traffic patterns of the tiered storage systems 115, 121 of the computing environment 100, 120, 130, 14, 200 by creating a series of records 400 describing the write frequency of each data block of the tiered storage system 115, 121. As shown by exemplary embodiment of FIG. 4a, each individual record 401 may describe the write frequency of each data block of the tiered storage system 115, 121 for each interval of time which makes up each time cycle. Each individual record 401 can be subsequently updated for each time cycle that occurs. A "cycle" may refer to a set of intervals of time wherein periodical patterns of access to the data blocks within the tiered storage system 115, 121. Time cycles may not occur at a fixed rate or constant frequency. In other words, some time cycles may be longer or shorter than other time cycles and may comprise more or less time intervals per cycle in some instances. When a time cycle is plotted, the resulting graphical representation may show patterns of access occurring in a periodic nature as peaks and valleys. The rising peak describing the increased access, updating, writing and/or erasure of data stored by the data blocks of the tiered storage system 115, 121 up to the plateau of the peak access of the tiered storage system 115, 121 and then all the way down to the lowest point of the graph describing access of the tiered storage system 115, 121 before the next rising peak starts again, may be considered a cycle.

Figure 4A:
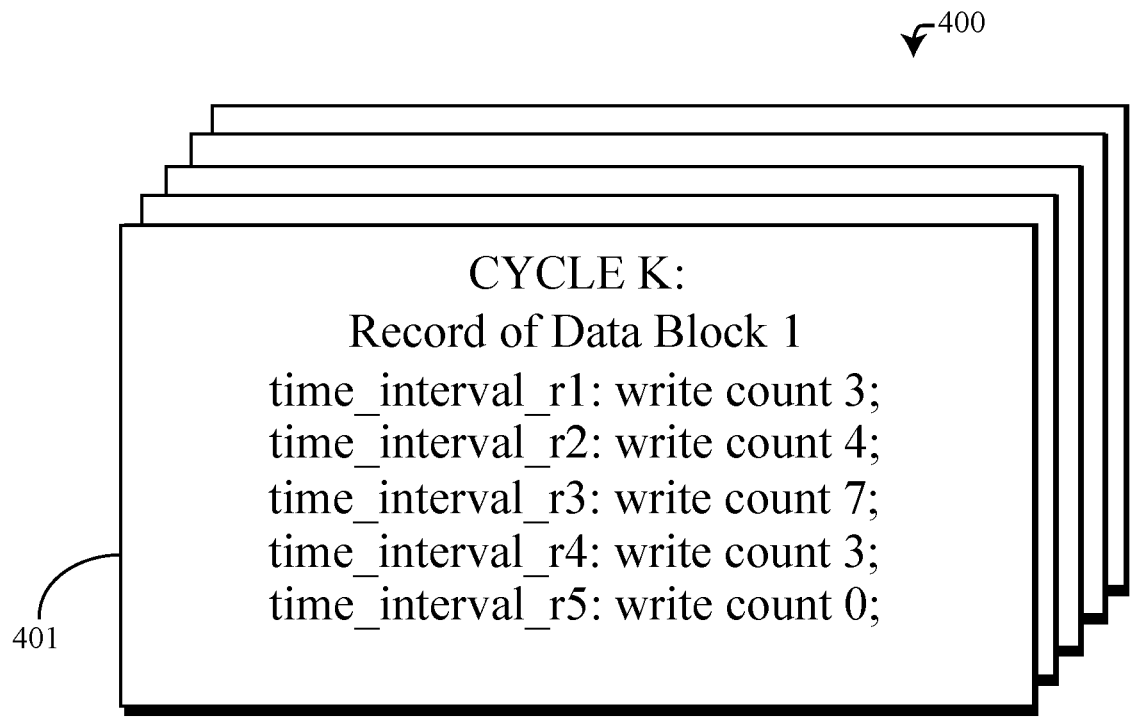
FIG. 4a illustrates an embodiment of a record describing a write frequency of a data block of a storage device for each interval of time in a cycle, in accordance with the present disclosure.

As depicted in FIG. 4a, a record of the first data block of a tiered storage system 115, 121 is shown. For each cycle that occurs, the number of writes occurring to data block 1 are shown for each interval of time in the cycle. For example, while the time series data module 105 is monitoring the data traffic of the tiered storage system 115, 121, the time series data module records storage activities occurring at data block 1. In the example of FIG. 4a, at the first time interval for cycle k (referred to as "time_interval_r1"), the time series data module 105 records a write count of 3 for data block 1. Subsequently, during the next interval of time, the record 401 indicates a write count of 4 during time_interval_r2, a write count of 7 for the following time interval of the cycle thereafter, time_interval_r3 and so on. During the next cycle (cycle K+1), a record of cycle k+1 is created by the time series data module 105 and the write frequency for each of the time intervals in the new cycle are recorded.

Using the time series data collected by the time series data module 105, embodiments of the time series data module 105 may create a time series prediction model. The objective of a times series prediction model may be to estimate the value of an unknown variable using the time series data collected by the time series data module 105. For example, the embodiments of the prediction model may use the collected time series data for each time interval within each cycle to predict the write frequency of data blocks for future intervals of future cycles of time. Forecasting a prediction of the future write frequency of particular data blocks may be useful for managing the storage of the tiered storage system 115, 121 because data blocks that are more frequently accessed (referred to as "hot" data blocks), may be identified as data blocks more suitable for migration to high-end storage devices, while data blocks predicted to be written to less frequently (referred to as "cold" data blocks) can be migrated and maintained using low-end storage devices.

Embodiments of the time series prediction model forecasting predictions of the future write frequency for each of the data blocks of a tiered storage system 115, 121 may forecast predictions up to a certain level of certainty (i.e. a confidence interval). In some embodiments of the time series prediction model, the model may make multiple predictions at various levels of confidence. For example, the model can forecast write frequency predictions at a confidence interval of 80%, 85%, 90%, 95%, 98%, etc., and combinations of intervals thereof. In some embodiments, a user or administrator of the storage management application 103 may select the desired level of confidence of the time series prediction model, whereas in other embodiments, the confidence level of the prediction model may improve over time automatically as more time series data becomes available to the model for making future predictions. In some embodiments, a standard deviation of the residuals (i.e. the difference between the set of observed write frequency values of the records 400 and the predicted write frequencies) may be chosen as the sample standard deviation.

Creation of the time series prediction model may be performed using a time-series algorithm that may have the ability to not only identify patterns in the data collected by the time series data module 105, but an algorithm that may possess the ability to extrapolate patterns from the collected data outside of the domain of the training data used to create the prediction model. For every time interval of the cycle, write frequency of the data blocks are recorded to one or more records 401 as the base of observation and learning by the time series data module 105. After enough observation of the data traffic patterns has been accumulated, the time series data module 105 may establish the time series prediction model and predictions about future time intervals of a future time cycle (i.e. the next time cycle) can be made by the storage management application 103. In some embodiments of the storage management application 103, the time series data module 105 may obtain enough write frequency data from data traffic patterns to create an accurate prediction model within 1 to 4 cycles of recording the write frequency data describing the storage activity of the tiered storage system 115, 121. Examples of algorithms that may be implemented to create the time series prediction model may include linear regression, exponential smoothing, autoregressive integrated moving average (ARIMA), dynamic linear modeling, and neural network modeling. In some instances, complex models may be used for the time series prediction model. For example, Autoregressive Conditional Heteroskedasticity (GARCH), Bayesian-based models and vector autoregression (VAR). In some embodiments, Neural Network Autoregression (NNAR) may be used, as well as deep learning models such as Recurrent Neural Networks (RNN), Long Short-Term Memory (LSTM) networks and Gated Recurrent Unit (GRU) networks may be used.

Embodiments of the storage management application 103 may comprise a prediction module 107. Embodiments of the prediction module 107 may perform functions or tasks associated with generating predictions describing a predicted write frequency of each data block in a tiered storage system 115, 121 for a future time cycle, creating a record of each prediction for each data block, and evaluating the metrics used to generate each prediction using the prediction model in order to determine whether the prediction module is making accurate write frequency predictions.

Figure 4B:
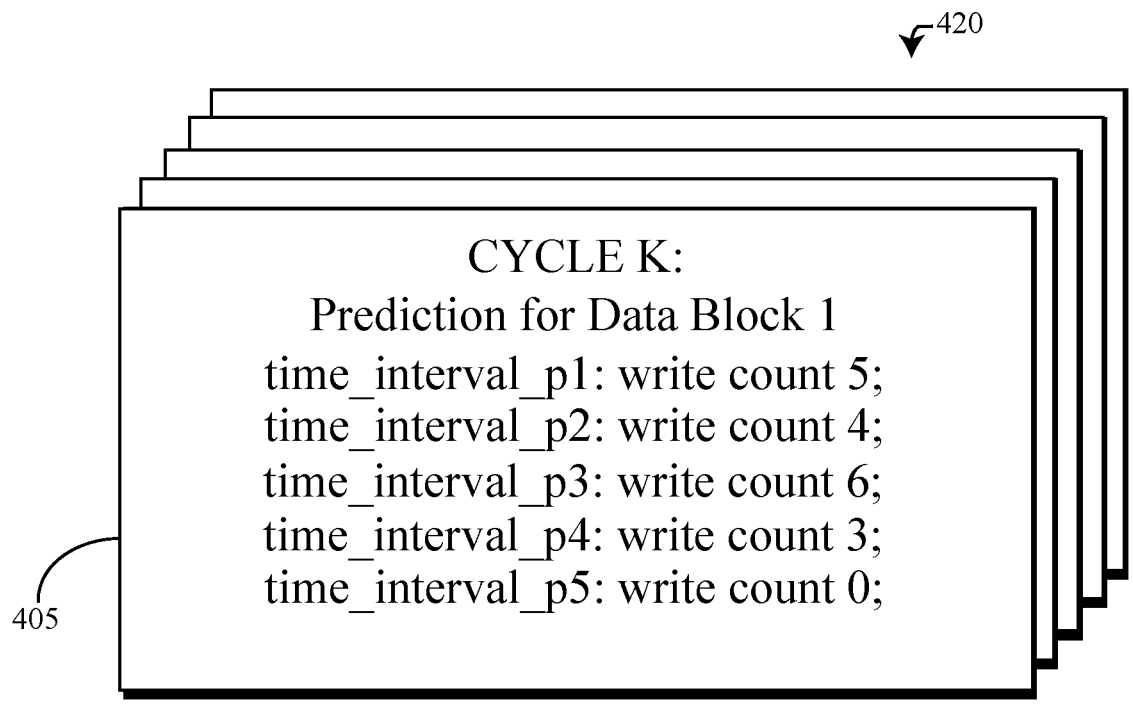
FIG. 4b illustrates an embodiment of a prediction record predicting a write frequency of a data block of a storage device for each interval of time in a cycle, in accordance with the present disclosure.

Once a prediction model has been established using the collected time series data, the prediction module 107 may use the established prediction model to generate a predicted write frequency for each data block of the tiered storage system 115, 121 expected by the storage management system 103 for a future time cycle. For example, during the current cycle (k), the prediction module 107 generates a write frequency prediction for each data block for each interval of time in the next time cycle (k+1). FIG. 4b depicts an example of one or more prediction records 405 that make up prediction records 420 describing the write frequency of each data black of the tiered storage system 115, 121. Similar to the record 401 of the data blocks, each prediction record 405 describes a predicted write frequency, shown as the write count for each interval of time. As shown in the example of a prediction for data block 1 shown in FIG. 4b, at the first predicted time interval (time_interval_p1), the prediction module 107 predicts a write count of 5 for the first data block during the cycle (described as "cycle k" in the example). Likewise, for the second time interval, time_interval_p2 a write count of 4 is predicted and the third time interval a write count of 6 is predicted (and so on).

In some embodiments, the prediction module 107 may generate a heat map of the data blocks comprising each storage device 117, 123, 125, 127 of the tiered storage system 115, 121. Embodiments of the heat map may mark the predicted hot data blocks for each predicted time cycle. The hot data marked on the heat map may be any data blocks predicted to have a write frequency of 1 write count or higher during the time cycle, wherein the higher the write count, the hotter the data. The prediction module 107 may sort the heat map by storage device 117, 123, 125, 127 and/or based on the predicted write frequency for each data block. For example, a heat map of a low-end storage device are sorted by the hottest data blocks first, for example, the data blocks with the highest predicted write frequency (highest write count), whereas high-end storage devices are sorted by the coldest data blocks first (i.e. data blocks with the fewest predicted write counts). By generating a heat map that sorts low-end devices based on the predicted hottest data blocks for the particular cycle and high-end devices by the predicted coldest data blocks, the storage management application 103 prioritizes the data blocks that should be evaluated more urgently for migration to a different storage device 117, 123, 125, 127 than the storage device 117, 123, 125, 127 currently maintaining the data written to the data blocks.

In addition to creating the series of prediction records 420 using the established prediction model, embodiments of the prediction module 107 may further evaluate the accuracy of the predictions being generated by the prediction model. In other words, the prediction module 107 may assess how close the write frequencies for each data block recorded in each record 401 is to the predicted write frequencies of the corresponding prediction record 405 of the same data block for each interval of a the same cycle. Embodiments of the prediction module 107 may evaluate the prediction metrics of the prediction model to identify the ability of the prediction model to identify patterns and may implement residual diagnostics to evaluate whether or not the model properly fits the time series data being collected. If the write frequency predictions made by the prediction module 107 are found to differentiate from the actual time series data recorded by the time series data module 105, the prediction model may be revised using the most up to date data collected and/or revise the algorithm being used to generate the prediction model.

The evaluation metrics of the prediction module 107 may help determine how closely the fitted values of the predicted write frequencies are to the actual write frequencies recorded. Embodiments of the evaluation metrics that may be utilized by the prediction module 107 may include the use of a mean absolute percent error (MAPE) and/or root mean squared error (RMSE). The formula for $$MAPE = \frac{100\%}{n} \sum_{t=1}^{n} \left| \frac{A_t - P_t}{A_t} \right|,$$

wherein $A_t$ is actual write frequency of a data block at time t, $P_t$ is the predicted write frequency of the data block at time t, and n is the total number of time intervals within the time cycle being predicted for the data block. The ratio of error provided as a result of using MAPE to evaluate the prediction module is provided as a percent indicating how well the prediction module forecasts the correct write frequency compared with a naïve average forecast. RMSE on the other hand may be calculated using the formula $RMSE=\sqrt{MSE}$.

In order to evaluate whether or not the prediction model being used properly fits the time series data collected, embodiments of the prediction module 107 may evaluate errors using residuals. A residual may refer to the observed value—the predicted value. In the case of predicting write frequencies of data blocks, the residual may be the actual data block write count for a time interval recorded in the data block record 401 minus the predicted write count of the prediction record 405, at the same time interval. Residuals that appear as errors to the prediction module 107 may appear to behave as "white noise" and may represent what cannot be accurately captured by the prediction model. The behavior of white noise may have two distinct properties: 1) the residuals are uncorrelated, wherein the autocorrelation function (ACF)=0; and 2) the residuals follow a normal distribution with a zero mean (unbiased) and a constant variance ($e_t \sim N(0, \sigma^2)$). If either of the two distinct properties of white noise is not present, this may suggest that there may be room to improve the prediction model.

To determine whether the residuals are uncorrelated can be performed using one of two methods. The first method may be for the prediction module 107 to apply a portmanteau test to check the hypothesis that the residuals are uncorrelated. The second method may be to plot the autocorrelation function and evaluate whether at least 95% of the time series data peaks fall within the interval ($-2/\sqrt{T}, 2/\sqrt{T}$), wherein T is the size of the time series data set. The zero-mean property of the white noise behavior properties may be verified using a T-test for the mean. Normality and constant variance can be visually checked using a histogram of the residuals or with a univariate normality test.

Embodiments of the storage management application 103 may comprise a migration module 109. Embodiments of the migration module 109 may perform the functions or tasks associated with evaluating the costs of migrating data from one or more storage devices 117, 123, 125, 127 of a particular tier in the tiered storage system 115, 121 to another tier of the tiered storage system 115, 121, marking hot data for staging and/or marking cold data for de-staging and executing the migration of the staged and de-staged data.

Embodiments of the migration module 109 may calculate and evaluate two cost values when determining whether or not to migrate data from one tier of the tiered storage system 115, 121 to another tier. The first cost that may be calculated is the cost to maintain the data stored in the current data blocks of a data storage device 117, 123, 125, 127. The formula for calculating the cost to maintain the data may be described as follows:

$$Cost_{maintain} = Price_{low}*Frequency_{hot} + Price_{high}*Frequency_{cold}$$

wherein $Price_{low}$ is a cost of the low-end storage device, $Frequency_{hot}$ is a write frequency of the data block storing the hot data, $Price_{high}$ is a cost of the high-end storage device and $Frequency_{cold}$ is the write frequency of the data block storing the cold data.

In some embodiments, the formula for calculating the cost to maintain the data blocks on the current storage device 117, 123, 125, 127 may be altered to account for situations wherein there are no data blocks being used by the high-end storage device and/or the high-end storage device has unused, available, data blocks. Under such circumstances, the formula for calculating the cost to maintain the data in the current location may use the formula as follows:

$$Cost_{maintain} = Price_{low}*Frequency_{hot}$$

The second cost that may be evaluated by embodiments of the migration module 108 may be the cost to migrate the hot data from the low-end storage device to the high-end storage device and to migrate the cold data from the high-end storage device to the low-end storage device. Embodiments of the migration module 109 may calculate the cost of data migration using the following formula:

$$Cost_{migrate} = Price_{low} + Price_{high} + Price_{low}*Frequency_{hot} + Price_{high}*Frequency_{cold}$$

wherein $Price_{low}$ is the cost of the low-end storage device, $Frequency_{hot}$ is the write frequency of a data block storing the hot data, $Price_{high}$ is a cost of the high-end storage device and $Frequency_{cold}$ is the write frequency of the data block storing the cold data.

In some embodiments, the formula for calculating the cost to migrate the data blocks from the current storage device 117, 123, 125, 127 may be altered to account for situations wherein there are no data blocks being used by the high-end storage device and/or the high-end storage device has unused available data blocks. Under such circumstances, the formula for calculating the cost to migrate the data from the current location to the high-end storage device may use the formula as follows:

$$Cost_{migrate} = Price_{high} + Price_{high}*Frequency_{cold}$$

Embodiments of the migration module 109 may determine whether or not to stage the hot data and de-stage the cold data for migration by comparing the $Cost_{maintain}$ against the $Cost_{migrate}$. If the cost to maintain the data stored by the data blocks is less than the cost to migrate the data ($Cost_{maintain} < Cost_{migrate}$) the migration module 109 will not stage and de-stage the data stored by the data blocks and instead leave the data on the current data storage devices 117, 123, 125, 127 of the tiered storage system 115, 121. Conversely, if the cost to maintain the data on the current storage devices 117, 123, 125, 127 is greater than the cost to migrate the data ($Cost_{maintain} > Cost_{migrate}$), the migration module 109 may proceed to mark the hot data on the low-end storage device to stage migration to a high-end storage device and mark the cold data of the high-end storage device to de-stage migration from the high-end storage device to a low-end storage device. Once the hot data and cold data have been marked for staging and de-staging respectively, the migration module 109 may migrate the data.

In some embodiments of the migration module 109, the migration module 109 may assess whether or not to migrate the data based on whether or not the cost to maintain the data stored by the data blocks minus the cost to migrate the data is greater than a pre-determined threshold level ($Cost_{maintain} - Cost_{migrate} >$ threshold). If the differential between $Cost_{maintain} - Cost_{migrate}$ is greater than the established threshold level, the migration module 109 may proceed to mark the hot data on the low-end storage device to stage migration to a high-end storage device and mark the cold data of the high-end storage device to de-stage migration from the high-end storage device to a low-end storage device. Likewise, if the $Cost_{maintain} - Cost_{migrate}$ does not exceed the threshold level, the migration module 109 may maintain data on the current storage device 117, 123, 125, 127 of the tiered storage system 115, 121.

In some embodiments, the migration module 109 may delay the migration of the hot data and cold data marked for migration. Embodiments of the migration module 109 may perform migration of the data at a point in time where the tiered storage system 115, 121 predictably experiences a significant decrease in the amount of write activity. The point in time where there is a significant decrease or low point in the amount of write activity being performed by the tiered storage system 115, 121 which may be referred to as a "cold point". The cold point in the write activity may be signified in the time series data by a low point in the write activity for the current cycle, prior to the peak rate of change in write frequency for the tiered storage system 115, 121. Embodiments of the migration module 109 my select a cold point in time of the current cycle to perform migration operations and once the cold point in time arrives, the migration module 109 may execute migration operations of the data, migrating the data between the high-end and low-end tiers of the tiered storage system 115, 121.

Embodiments of the storage management application 103 may comprise a reporting module 111. Embodiments of the reporting module 111 may perform the function or task of notifying one or more users and/or administrators of storage management application 103 about data migration activities, including the dates and times of scheduled data migrations, heat map activity of one or more storage devices 117, 123, 125, 127. In some embodiments, the reporting module 111 may generate reports describing data migration activities performed and/or a cost savings report indicating the amount of saving the storage management application 103 has saved the user or administrator by migrating and/or maintaining data between different tiers of the tiered storage system 115, 121.

Method for Automating Flash Storage Data Migration

Figure 5:
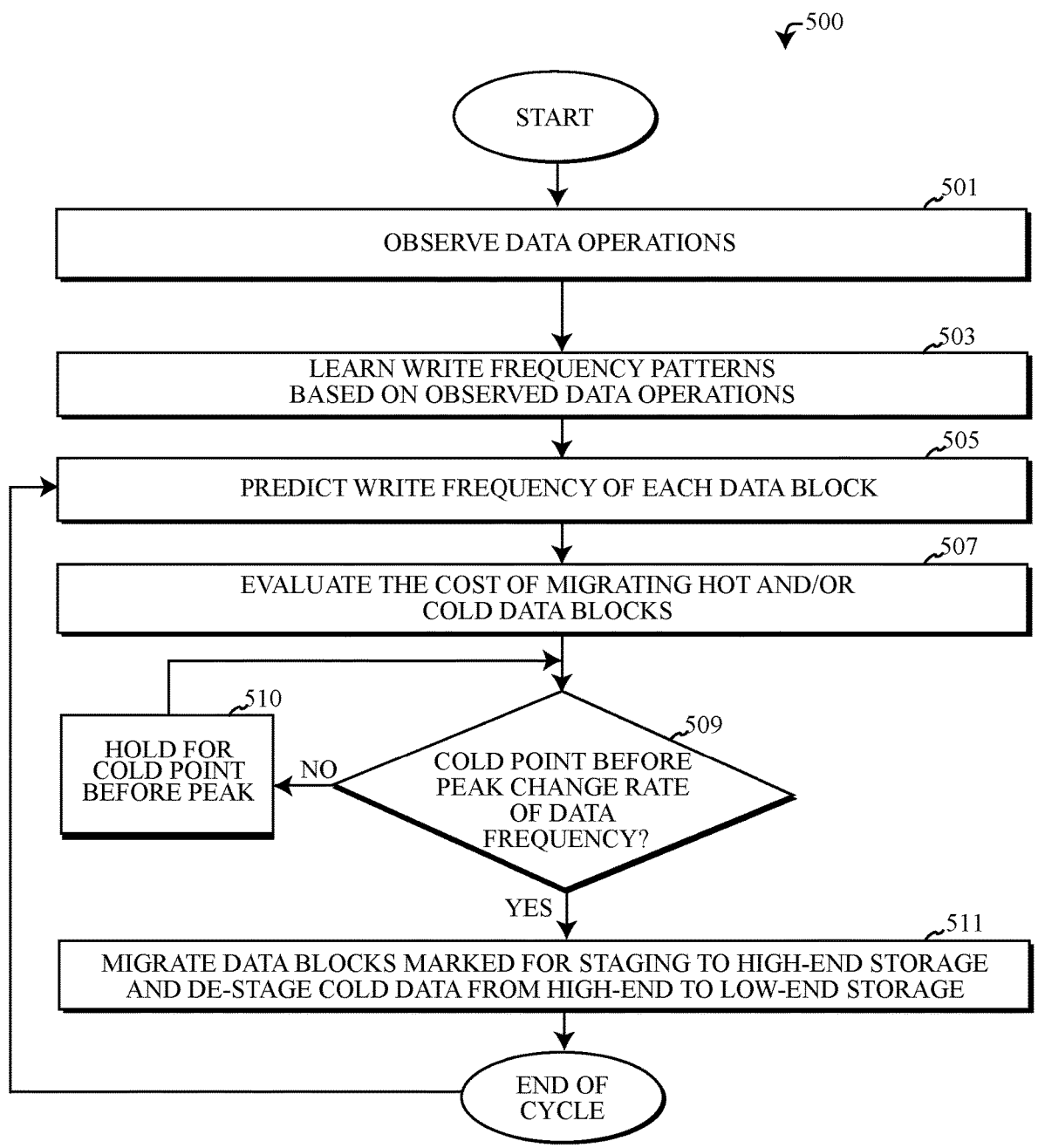
FIG. 5 depicts a flowchart describing an embodiment of an algorithm implementing operational steps of a storage management application automating data migration within a computing environment, in accordance with the present disclosure.
Figure 6A:
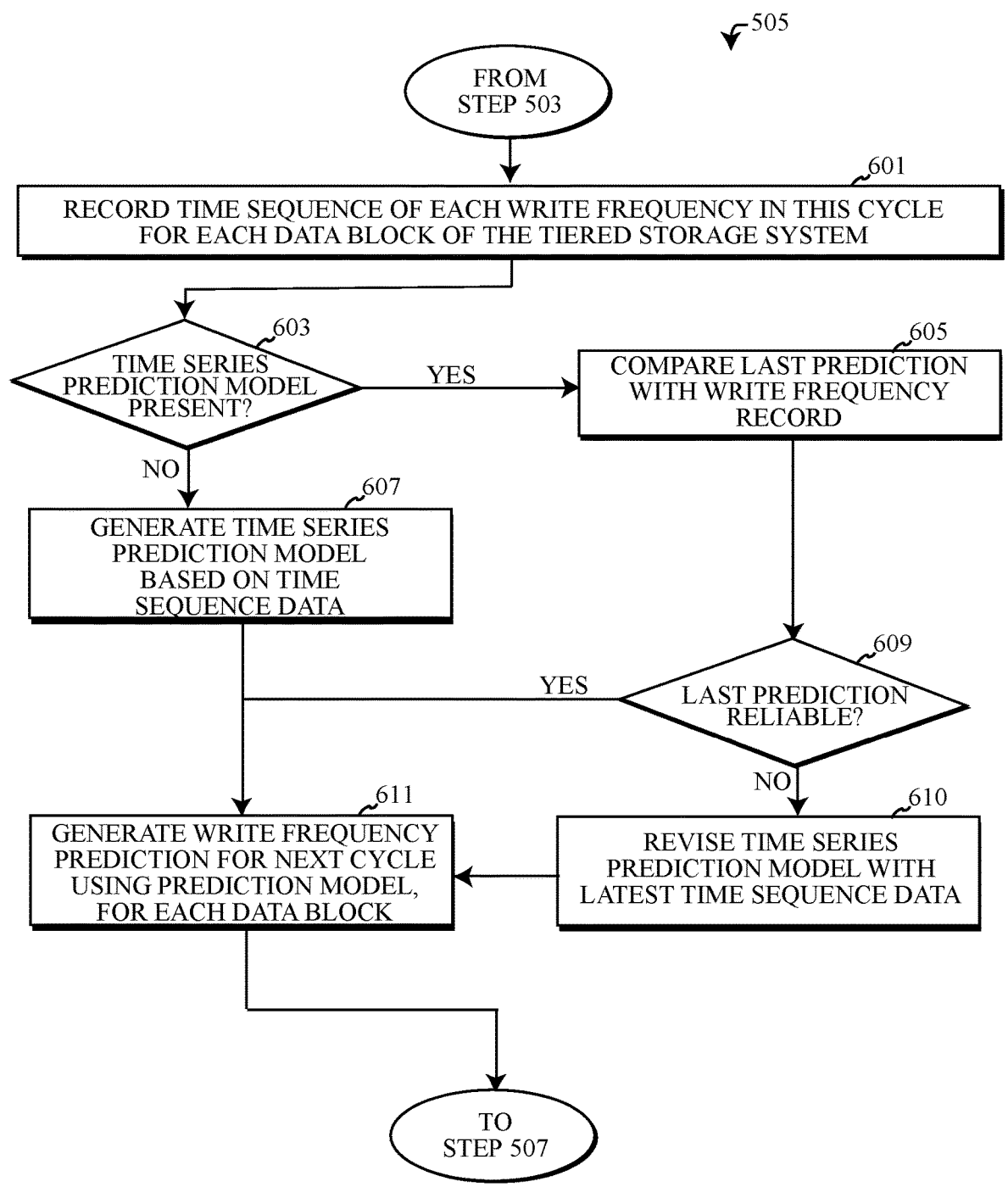
FIG. 6a depicts an embodiment of an algorithm for predicting the write frequency of data block(s) in a storage device.
Figure 6B:
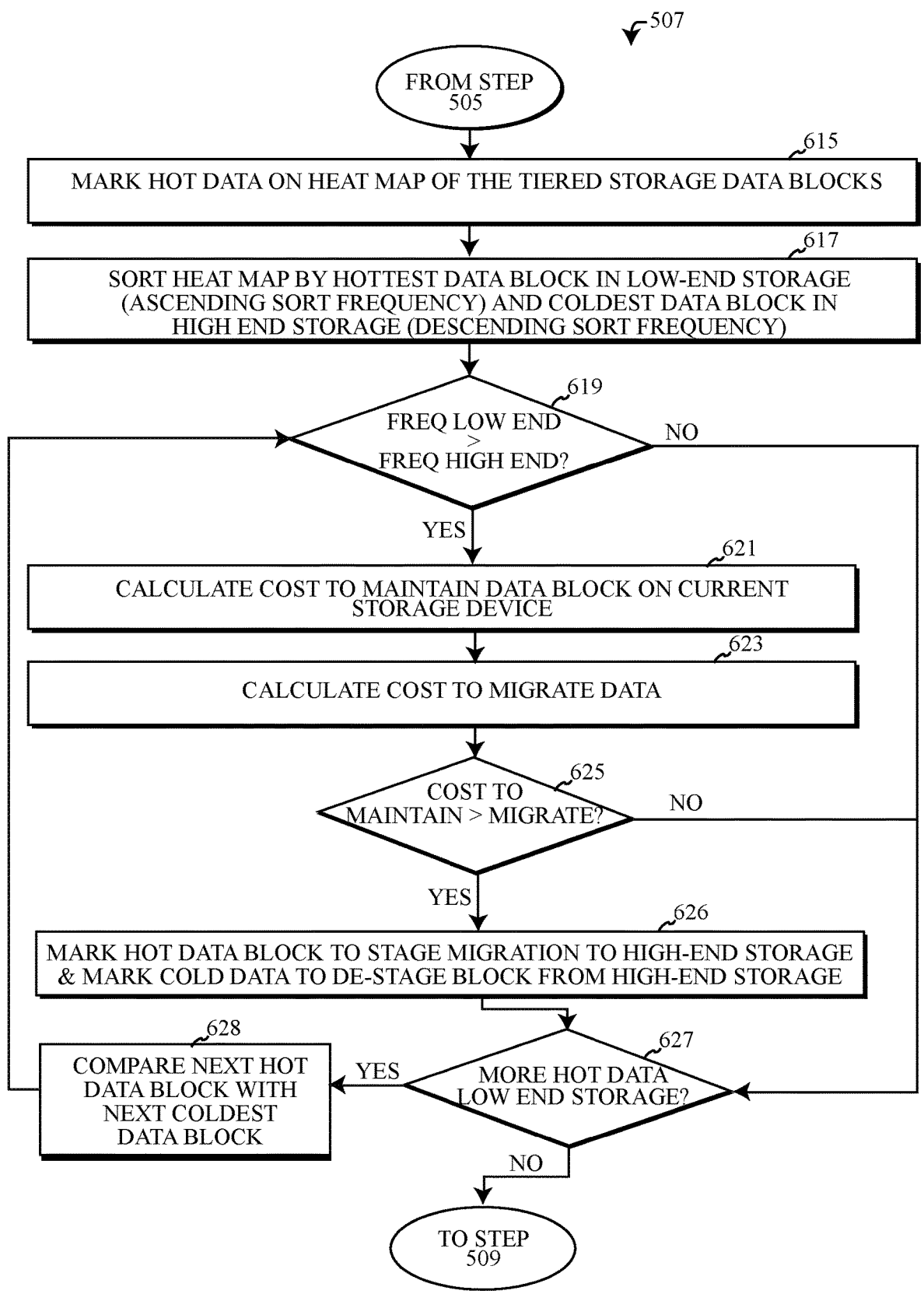
FIG. 6b depicts an embodiment of an algorithm for evaluating the cost of migrating data block(s) of a storage device between a plurality of storage devices.

The drawings of FIGS. 5-6b represent embodiments of an algorithm 500 for automating data migration between one or more storage devices 117, 123, 125, 127 of a tiered storage system 115, 121 as described by FIGS. 1a-3 using one or more computer systems as defined generically by computer system 700 of FIG. 7 below and more specifically by the embodiments of specialized computer systems depicted in FIGS. 1a-3 and as described herein. A person skilled in the art should recognize that the steps of the method described in FIGS. 5-6b may be performed in a different order than presented and the methods of FIGS. 5-6b may not necessarily require all the steps described herein to be performed. Rather, some embodiments may alter the methods by using one or more of the steps discussed below.

FIG. 5 represents a flowchart illustrating an algorithm 500 for automating data migration between storage devices 117, 123, 125, 127 of a tiered storage system 115, 121 in a computing environment 100, 120, 130, 140, 200 in accordance with the embodiments of the present disclosure. The embodiment of the method 500 may begin at step 501. In step 501, the storage management application 103 may proceed by observing data operations of a tiered storage system 115, 121. Embodiments of the storage management application 103, may begin collecting time series data describing the data traffic and write operations of the tiered storage system 115, 121. In some embodiments, the collection and analysis of the data traffic being observed may be performed by the time series data module 105, performing the tasks and functions described above. During step 501, the observation of data operations may include recording, one or more, records 401 describing the write frequency of each data block within the tiered storage system 115, 121, at each interval of time for each cycle of time.

In step 503 of algorithm 500, the storage management application 103 may analyze the observed data operations of step 501 and using the observed data operations, including the collection of time series data, learn and identify write frequency patterns for storage devices 117, 123, 125, 127 of the tiered storage system 115, 121. For example, the time series data module 105 learns and identifies the periodic nature of the time series data being received. For instance, the time series data module 105 may identify patterns relating to the volume of writing, accessing, updating and erasing of data stored by the tiered storage system 115, 121 corresponding to particular times of day, days of the week, days of the months, months out of the year, etc. Embodiments of the time series data module 105 may identify the periods of time where usage of the tiered storage system 115, 121 may be the highest (peak usage having the highest rate of change in the write frequency) and periods of time wherein the usage of the tiered storage system 115, 121 is the lowest (i.e. expected cold points having the lowest rate of change in the write frequency of the data blocks).

Embodiments of the time series data module 105 may use the collected time series data and one or more statistical algorithms or modeling techniques to create a prediction model. The selected algorithm may learn the patterns using training data provided to the time series data module 105 but may be able to further extrapolate patterns from the collected data to infer additional patterns. Embodiments of the time series data module 105 may obtain enough write frequency data from data traffic patterns to create an accurate prediction model within 1 to 4 cycles of recording the write frequency data describing the storage activity of the tiered storage system 115, 121. Examples of algorithms that may be implemented to create the time series prediction model may include linear regression, exponential smoothing, autoregressive integrated moving average (ARIMA), dynamic linear modeling, and neural network modeling. In some instances, complex models may be used for the time series prediction model. For example, Autoregressive Conditional Heteroskedasticity (GARCH), Bayesian-based models and vector autoregression (VAR). In some embodiments, Neural Network Autoregression (NNAR) may be used, as well as deep learning models such as Recurrent Neural Networks (RNN), Long Short-Term Memory (LSTM) networks and Gated Recurrent Unit (GRU) networks may be used.

In step 505 of the algorithm 500, the storage management application 103 may predict the write frequency of each data block in the tiered storage system 115, 121 using the prediction model established by the storage management application 103 using the patterns learned in step 503. In some embodiments of the storage management application 103, the prediction module 107 may perform the step of predicting the write frequency of each of the data blocks of the storage devices 117, 123, 125, 127 of the tiered storage system 115, 121. FIG. 6a further describes each of the additional sub-steps that may be included as part of the prediction step of step 505 of algorithm 500. The prediction step 505 may begin at sub-step 601, wherein the storage management application 103 records the time series data of each data block in the current cycle to one or more records 401 corresponding to each data block for each interval of time within the cycle.

In sub-step 603 of step 505, a determination may be made whether or not a time series prediction model has been established and is currently present. If a time series prediction model has not been created or established by the storage management application 103, for example using the patterns of the data traffic as described above in step 503, the algorithm may proceed to sub-step 607 of step 505 and generate a time series prediction model based on the history of time series data collected by the time series data module 105. From sub-step 607, the algorithm may proceed to step 611, wherein the prediction module 107 generates a write frequency prediction for each interval of time of the next cycle using the prediction model for each data block of the tiered storage system 115, 121 as shown in the prediction record 405 for data block 1 in FIG. 4b. Conversely, if the determination in sub-step 603 determines that a prediction model is already present, the algorithm 500 may proceed to sub-step 605.

In sub-step 605 of step 505, the prediction module 107 proceeds to determine the reliability of an established prediction model using one or more evaluation metrics and/or residual evaluation techniques described above. Embodiments of the prediction module 107 may compare previous write frequency predictions for each interval of time in the current cycle recorded in prediction record 405 with the actual write frequencies recorded in record 401 for the same intervals of time in the same cycle that the predictions were made for. In sub-step 609, the prediction module 107 may determine whether the predictions made about the current cycle are reliable. To assess reliability of the prediction model, prediction module 107 may compare the predicted write frequencies for each interval of time against corresponding write frequencies actually recorded (i.e. calculating the residuals). If the difference between the predicted write frequency is above an established threshold level of acceptable difference, the prediction model may be considered inaccurate or unreliable and therefore may be revised to achieve an acceptable level of accuracy. For example, a level of unreliability measured using mean absolute percent error and the level of error as calculated by the MAPE formula rises above an acceptable percentage of error. Accordingly, the algorithm 500 may proceed from sub-step 609 to sub-step 610 wherein the prediction module 107 and/or the time series data module 105 may revise the time series prediction model using the most up to date time sequence data recorded in the series of records 400 and/or amend the prediction algorithm being applied to the time sequence data to create a more accurate prediction model using a more accurate algorithm. For example, changing from a linear regression algorithm to an ARIMA algorithm to generate the prediction model.

In some embodiments of sub-step 609, the prediction module 109 may use one or more methods to further determine whether or not the prediction model being used properly fits the time series data collected by evaluating one or more errors in prediction write frequencies using the residuals to the measure of unreliability of each prediction. As discussed above, the prediction module 109 may verify whether or not the errors of the predictions behave as "white noise" or not. The prediction module 109 may proceed to determine whether or not the residuals are uncorrelated, based on the autocorrelation function equaling 0 and whether the residuals follow a normal distribution with an unbiased zero mean and a constant variance ($e_t \sim N(0, \sigma^2)$). If either of the two distinct properties of white noise is not present the prediction model may be considered unreliable in sub-step 609 and the algorithm 500 may proceed to sub-step 610 for further revision of the prediction model in a manner that would properly fit the time series data being collected. From sub-step 610, the algorithm may proceed to sub-step 611, wherein the prediction module 109 generates a write frequency prediction for each data block, for each time interval of the next time cycle using the revised prediction model. The prediction module 109 may record and store each predicted write frequency as a prediction record 405 for each data block.

Upon generating the write frequency prediction for each data block of the tiered storage system 115, 121 in sub-step 611 of step 505, the algorithm 500 may proceed to step 507. In step 507 of algorithm 500, storage management application 103 may evaluate the cost of migrating hot and cold data blocks between one or more storage device(s) 117, 123, 125, 127 versus the cost of maintaining the hot or cold data blocks on the storage devices 117, 123, 125, 127 where the data blocks currently reside within the tiered storage system 115, 121. The evaluation step 507 to determine the cost of migration and/or maintenance of the data blocks may be broken down into a series of sub-steps as described by the flowchart of FIG. 6b.

As shown in FIG. 6b, the evaluation step 507 may begin at sub-step 615. Using the write frequency predictions performed by the prediction module 107 in step 505, the storage management application 103 may create a heat map describing the predicted write frequencies of each data block of the tiered storage system 115, 121. Data blocks predicted to the experience the highest write frequencies for the next cycle of time may be considered the hottest data blocks, and data blocks predicted to experience a write frequency of approximately zero write counts during the next cycle of time may be considered a cold date block. In sub-step 617, the storage management application 103 may sort the heat map for each storage device 117, 123, 125, 127 of the tiered storage system 115, 121. Embodiments of the storage management application 103 may sort low-end storage devices by an ascending frequency of heat, wherein the hottest data blocks may be sorted to the top of the heat map for the low-end storage device. Conversely, heat maps of high-end storage devices may be sorted in a descending sort frequency, wherein the coldest data blocks of the high-end storage devices are positioned at the top of the heat map and the hottest data blocks at the bottom of the sorting.

In sub-step 619 of step 507, the write frequency of the hottest data block in the low-end storage may be compared with the write frequency of the coldest data block of the high-end storage. A determination may be made by the storage management application 103, deciding whether write frequency of the data block of the low-end storage device is greater than the write frequency of the high-end storage device. If the write frequency of the low-end storage device is determined not to be greater than the write frequency of the high-end storage device in sub-step 619, the algorithm 500 may proceed to sub-step 627 (described in further below) to determine whether or not additional hot data resides on the low-end storage device or proceed to step 509 of algorithm 500.

Conversely, if during sub-step 619 a determination is made that the write frequency of the hottest data block of the low-end storage device is greater than the write frequency of the coldest data block of the high-end storage device, the algorithm proceeds to sub-step 621. In sub-step 621, the storage management application 621 may calculate the cost for maintaining the predicted writing operations of data block analyzed in sub-step 619 during the next time cycle as predicted by the prediction module in step 505 of algorithm 500. The cost for maintaining the data block on the current storage device may be calculated using the formula $Cost_{maintain} = Price_{low} * Frequency_{hot} + Price_{high} * Frequency_{cold}$, wherein $Price_{low}$ is a cost of the low-end storage device, $Frequency_{hot}$ is a write frequency of the data block storing the hot data, $Price_{high}$ is a cost of the high-end storage device and $Frequency_{cold}$ is the write frequency of the data block storing the cold data. Alternative, in some embodiments wherein there are no data blocks being used by the high-end storage device and/or the high-end storage device has unused, available, data blocks, the formula used for calculating the cost to maintain the data block on the current storage device 117, 123, 125, 127 may be calculated using the formula $Cost_{maintain} = Price_{low} * Frequency_{hot}$.

In sub-step 623, a cost for migrating the data stored by the data blocks from either the high-end and/or low-end storage device to the opposite storage device 117, 123, 125, 128 may be calculated. The formula for calculating the cost for migrating the data may be performed using the formula $Cost_{migrate} = Price_{low} + Price_{high} + Price_{low} * Frequency_{hot} + Price_{high} * Frequency_{cold}$, wherein $Price_{low}$ is the cost of the low-end storage device, $Frequency_{hot}$ is the write frequency of a data block storing the hot data, $Price_{high}$ is a cost of the high-end storage device and $Frequency_{cold}$ is the write frequency of the data block storing the cold data. Alternatively, in some embodiments wherein there are no data blocks being used by the high-end storage device and/or the high-end storage device has unused available data blocks, the cost to migrate the data from the current location to the high-end storage device may be calculated using the formula $Cost_{migrate} = Price_{high} + Price_{high} * Frequency_{cold}$.

In sub-step 625 of step 507, a determination whether to maintain the data blocks on the current storage device 117, 123, 125, 127 or migrate the data of the data blocks may be made comparing the $Cost_{maintain}$ and the $Cost_{migrate}$ previously calculated in sub-steps 621 and 623. If the $Cost_{maintain}$ is not greater than the $Cost_{migrate}$, the algorithm 500 may proceed to sub-step 627 and further determine whether or not additional hot data resides on the low-end storage device. Conversely, if the $Cost_{maintain}$ is greater than the $Cost_{migrate}$, the algorithm 500 may proceed to step 626, wherein the storage management application 103 may mark the hot data block of the low-end storage device for staging migration to the high-end storage device and further mark the cold data block of the high-end storage device to be de-staged from the high-end storage device and migrated to the low-end storage device.

In sub-step 627 of step 507, a determination is made whether additional hot data blocks exist on the low-end storage device. During sub-step 627, the determination may be made by analyzing the sorted heat map of sub-step 617. The storage management application 103 may move to the next hottest data block of the low-end storage device in the sorted heat map with a predicted write frequency for the next cycle of time. If a hot data block exists on the heat map, the algorithm 500 may proceed to step 628, compare the hot data block of the low-end storage device with the next coldest data block of the high-end storage device and proceed back to step 619, comparing the write frequency of the newly selected hot data block and the newly selected cold data block.

Conversely, if in step 627 a determination is made that there are no more additional hot data blocks present within the low-end storage device for analysis and potential migration operations, the algorithm 500 may proceed to step 509. Referring back to FIG. 5, in step 509 of algorithm 500, a determination may be made in step 509, determining when to migrate the data blocks marked for staging and de-staging in sub-step 626. In the exemplary embodiment of algorithm 500, migration may be performed at a cold point in the data operations and data traffic patterns. For example before an expected peak change in the rate of the data write frequency. In other words, a point in time before the peak amount of writing operations occurs during the current cycle, and more particularly at a point in time where minimal (if any) write operations to the tiered storage system 115, 121 are expected to occur based on the write frequency patterns analyzed in step 503. If, the current time interval within the present cycle of time is not cold point in time before the next peak change in the rate of the data write frequency, the algorithm 500 proceeds to step 510 and continues to delay performance of migration operations until a cold point is determined in step 509. Otherwise, if the current point in time is cold point for the rate of change in the write frequency, the algorithm may proceed to step 511, wherein the data blocks marked for staging and de-staging in sub-step 626 of step 507 are migrated. Data stored by data blocks of the low-end storage device are migrated to data blocks of the high-end storage device while the cold data stored by the data blocks of the high-end storage device are migrated to data blocks of the low-end storage device.

Computer System

FIG. 7 illustrates a block diagram of internal and external components depicting an embodiment of a computer system 700, which may be representative of the one or more computer systems depicted in the computing environment 100, 130, 140, 200 as shown in FIGS. 1a-3, in accordance with the embodiments of the present disclosure. It should be appreciated that FIG. 7 provides only an illustration of one implementation and does not imply any limitations with regard to the environments in which different embodiments may be implemented. In general, the components illustrated in FIG. 7 are representative of any electronic device capable of executing machine-readable program instructions.

Examples of computer systems, environments, and/or configurations that may be represented by the components illustrated in FIG. 7 include, but are not limited to, personal computer systems, server computer systems, thin clients, thick clients, laptop computer systems, tablet computer systems, cellular telephones (e.g., smart phones), multiprocessor systems, microprocessor-based systems, network PCs, minicomputer systems, mainframe computer systems, and distributed cloud computing environments that include any of the above systems or devices.

Computer system 700 may include communications fabric 702, which provides for communications between one or more processors 703, memory 705, persistent storage 706, communications unit 711, and one or more input/output (I/O) interfaces 715. Communications fabric 702 can be implemented with any architecture designed for passing data and/or controlling information between processors 703 (such as microprocessors, communications and network processors, etc.), memory 705, external devices 717, and any other hardware components within a system. For example, communications fabric 702 can be implemented with one or more buses.

Memory 705 and persistent storage 706 may be computer-readable storage media. Embodiments of memory 705 may include random access memory (RAM) and cache 707 memory. In general, memory 705 can include any suitable volatile or non-volatile computer-readable storage media. Software, such as a vocational application 103 may be stored in persistent storage 706 for execution and/or access by one or more of the respective processors 703 via one or more devices of memory 705.

Persistent storage 706 may include, for example, a plurality of magnetic hard disk drives. Alternatively, or in addition to magnetic hard disk drives, persistent storage 706 can include one or more solid state hard drives, semiconductor storage devices, read-only memories (ROM), erasable programmable read-only memories (EPROM), flash memories, or any other computer-readable storage media that is capable of storing program instructions or digital information. Embodiments of the media used by persistent storage 706 can also be removable. For example, a removable hard drive can be used for persistent storage 706. Other examples include optical and magnetic disks, thumb drives, and smart cards that are inserted into a drive for transfer onto another computer-readable storage medium that is also part of persistent storage 706.

Communications unit 711 provides for communications with other computer systems or devices via a network (e.g., network 150 and/or storage network 141). In the exemplary embodiment, communications unit 711 may include network adapters or interfaces such as a TCP/IP adapter cards, wireless Wi-Fi interface cards, 3G, 4G, or 5G wireless interface cards or other wired or wireless communication links. The network 150 can comprise, for example, copper wires, optical fibers, wireless transmission, routers, firewalls, switches, gateway computers and/or edge servers. Software and data used to practice embodiments of the present invention can be downloaded to each of the computer systems operating in computing environment 100, 130, 140, 200 or computer system 700 through communications unit 711 (e.g., via the Internet, a local area network or other wide area network). From communications unit 711, the software and data can be loaded onto persistent storage 706.

One or more I/O interfaces 715 may allow for input and output of data with other devices that may be connected to computer system 700. For example, I/O interface 715 can provide a connection to one or more external devices 717 such as one or more internet-of-things devices, recording devices such as an audio system, video systems, one or more sensor device(s), input devices such as a keyboard, computer mouse, touch screen, virtual keyboard, touch pad, pointing device, or other human interface devices. External devices 717 can also include portable computer-readable storage media such as, for example, thumb drives, portable optical or magnetic disks, and memory cards. I/O interface 715 may connect to human-readable display 718. Human-readable display 718 provides a mechanism to display data to a user and can be, for example, a computer monitor or screen. Human-readable display 718 can also be an incorporated display and may function as a touch screen, such as a built-in display of a tablet computer.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising the steps of:
   recording time series data describing a write frequency of each data block stored by a tiered flash-based storage system comprising a high-end flash-based storage device and a low-end flash-based storage device;
   generating a time series prediction model using the time series data;
   generating a write frequency prediction of each data block of the tiered flash-based storage system for a future write cycle using the time series prediction model;
   calculating a cost for maintaining hot data stored on the low-end flash-based storage device and cold data stored on the high-end flash-based storage device, of the tiered flash-based storage system, wherein the cost for maintaining the hot data on the low-end flash-based storage device and the cold data on the high-end flash-based storage device is calculated using a formula: $Cost_{maintain} = Price_{low} * Frequency_{hot} + Price_{high} * Frequency_{cold}$, wherein $Price_{low}$ is a cost of the low-end flash-based storage device, $Frequency_{hot}$ is a write frequency of a data block storing the hot data, $Price_{high}$ is a cost of the high-end flash-based storage device and $Frequency_{cold}$ is a write frequency of the data block(s) storing the cold data;
   calculating a cost for migrating the hot data from the low-end flash-based storage device to the high-end flash-based storage device and migrating the cold data of the high-end flash-based storage device to the low-end flash-based storage device;
   determining the cost for migrating the hot data and migrating the cold data is less than the cost for maintaining the hot data and maintaining the cold data; and
   in response to determining the cost for migrating the hot data and migrating the cold data is less than the cost for maintaining the hot data and maintaining the cold data, migrating the hot data from the low-end flash-based storage device to the high-end flash-based storage device and the cold data from the high-end flash-based storage device to the low-end flash-based storage device.

2. The computer-implemented method of claim 1, wherein the cost for migrating the hot data from the low-end flash-based storage device to the high-end flash-based storage device and migrating the cold data of the high-end flash-based storage device to the low-end flash-based storage device is calculated using a formula: $Cost_{migrate} = Price_{low} + Price_{high} + Price_{low} * Frequency_{hot} + Price_{high} * Frequency_{cold}$, wherein $Price_{low}$ is a cost of the low-end flash-based storage device, $Frequency_{hot}$ is a write frequency of a data block storing the hot data, $Price_{high}$ is a cost of the high-end flash-based storage device and $Frequency_{cold}$ is a write frequency of a data block storing the cold data.

3. The computer-implemented method of claim 1, further comprising the steps of:
   marking the hot data on each data block to stage for migration from the low-end flash-based storage device to the high-end flash-based storage device; and
   marking the cold data on each data block to de-stage for migration from the high-end flash-based storage device to the low-end flash-based storage device.

4. The computer-implemented method of claim 3 further comprising the steps of:
   identifying a time period wherein the tiered flash-based storage system experiences a peak rate of change in write frequency of each data block;
   selecting cold point in time prior to the peak rate of change in write frequency of each data block wherein the tiered flash-based storage system experiences minimal changes in the write frequency; and
   performing the migrating step during the cold point in time.

5. The computer-implemented method of claim 1, wherein the high-end flash-based storage device is single-level cell (SLC) solid state drive (SSD) and the low-end flash-based storage device is an SSD selected from the group consisting a multi-level cell (MLC) SSD, a triple-level cell (TLC) SSD and a combination thereof.

6. The computer-implemented method of claim 1, wherein a service life of the high-end flash-based storage device is greater than a service life of the low-end flash-based storage device, wherein the service life of the high-end flash-based storage device is calculated using a first formula:

$$\frac{PE_{high}}{\sum_{k=0}^{n} Top(f(k))} \Big/ Num_{highblocks},$$

wherein $PE_{high}$ is a maximum number of program/erase cycles of the high-end flash-based storage device, $\sum_{k=0}^{n} Top(f(k))$ is a write frequency sum of top hot data blocks in the high-end flash-based storage device, and $Num_{highblocks}$ is a number of data blocks the high-end flash-based storage device contains; and the service life of the low-end flash-based storage device is calculated using a second formula:

$$\frac{PE_{low}}{\sum_{k=0}^{n} ExpTop(f(k))} \Big/ Num_{lowblocks},$$

wherein $PE_{low}$ is a maximum number of program/erase cycles of the low-end flash-based storage device, $\sum_{k=0}^{n} ExpTop(f(k))$ is a write frequency sum of the low-end flash-based storage device except for hot data blocks in the low-end flash-based storage device, and $Num_{lowblocks}$ is a number of data blocks that the low-end flash-based storage device contains.

7. A computer system comprising:
   at least one processor;
   a tiered flash-based storage system coupled to the at least one processor, the tiered flash-based storage system comprising a high-end flash-based storage device and a one low-end flash-based storage device, wherein a service life of the high-end flash-based storage device is greater than a service life of the low-end flash-based storage device, and the service life of the high-end flash-based storage device is calculated using a first formula:

$$\frac{PE_{high}}{\frac{\sum_{k=0}^{n} Top(f(k))}{Num_{highblocks}}},$$

wherein $PE_{high}$ is a maximum number of program/erase cycles of the high-end flash-based storage device, $\Sigma_{k=0}^{n} Top(f(k))$ is a write frequency sum of top hot data blocks in the high-end flash-based storage device and $Num_{highblocks}$ is a number of data blocks the high-end flash-based storage device contains; and the service life of the low-end flash-based storage device is calculated using a second formula:

$$\frac{PE_{low}}{\frac{\sum_{k=0}^{n} ExpTop(f(k))}{Num_{lowblocks}}},$$

wherein $PE_{low}$ is a maximum number of program/erase cycles of the low-end flash-based storage device, $\Sigma_{k=0}^{n} ExpTop(f(k))$ is a write frequency sum of the low-end flash-based storage device except for hot data blocks in the low-end flash-based storage device, and $Num_{lowblocks}$ is a number of data blocks that the low-end flash-based storage device contains;
   a computer-readable storage media coupled to the at least one processor, wherein the computer-readable storage media contains program instructions executing a computer-implemented method comprising the steps of:
      recording time series data describing a write frequency of each hot data block stored by the tiered flash-based storage system,
      generating a time series prediction model using the time series data,
      generating a write frequency prediction of each data block of the tiered flash-based storage system for a future write cycle using the time series prediction model,
      calculating a cost for maintaining hot data stored on the low-end flash-based storage device and cold data stored on the high-end flash-based storage device, in the tiered flash-based storage system,
      calculating a cost for migrating the hot data from the low-end flash-based storage device to the high-end flash-based storage device and migrating the cold data of the high-end flash-based storage device to the low-end flash-based storage device,
      determining the cost for migrating the hot data and migrating the cold data is less than the cost for maintaining the hot data and maintaining the cold data, and
      in response to determining the cost for migrating the hot data and migrating the cold data is less than the cost for maintaining the hot data and maintaining the cold data, migrating the hot data from the low-end flash-based storage device to the high-end flash-based storage device and the cold data from the high-end flash-based storage device to the low-end flash-based storage device.

8. The computer system of claim 7, wherein the cost for maintaining the hot data on the low-end flash-based storage device and the cold data on the high-end flash-based storage device is calculated using a formula: $Cost_{maintain} = Price_{low} * Frequency_{hot} + Price_{high} * Frequency_{cold}$, wherein $Price_{low}$ is a cost of the low-end flash-based storage device, $Frequency_{hot}$ is a write frequency of a data block storing the hot data, $Price_{high}$ is a cost of the high-end flash-based storage device and $Frequency_{cold}$ is a write frequency of a data block storing the cold data.

9. The computer system of claim 7, wherein the cost for migrating the hot data from the low-end flash-based storage device to the high-end flash-based storage device and migrating the cold data of the high-end flash-based storage device to the low-end flash-based storage device is calculated using a formula: $Cost_{migrate} = Price_{low} + Price_{high} + Price_{low} * Frequency_{hot} + Price_{high} * Frequency_{cold}$, wherein $Price_{low}$ is a cost of the low-end flash-based storage device, $Frequency_{hot}$ is a write frequency of a data block storing the hot data, $Price_{high}$ is a cost of the high-end flash-based storage device and $Frequency_{cold}$ is a write frequency of a data block storing the cold data.

10. The computer system of claim 7, wherein the computer-implemented method further comprises the steps of:
    marking the hot data on each data block to stage for migration from the low-end flash-based storage device to the high-end flash-based storage device; and
    marking the cold data on each data block to de-stage for migration from the high-end flash-based storage device to the low-end flash-based storage device.

11. The computer system of claim 10, wherein the computer-implemented method further comprises the steps of:
    identifying a time period wherein the tiered flash-based storage system experiences a peak rate of change in write frequency of each data block;
    selecting cold point in time prior to the peak rate of change in write frequency of each data block wherein the tiered flash-based storage system experiences minimal changes in the write frequency; and
    performing the migrating step during the cold point in time.

12. The computer system of claim 7, wherein the high-end flash-based storage device is single-level cell (SLC) solid state drive (SSD) and the low-end flash-based storage device is an SSD selected from the group consisting a multi-level cell (MLC) SSD, a triple-level cell (TLC) SSD and a combination thereof.

13. A computer program product comprising:
    one or more computer-readable storage media having computer-readable program instructions stored on the one or more computer-readable storage media, said program instructions executes a computer-implemented method comprising the steps of:

recording time series data describing a write frequency of each hot data block stored by a tiered flash-based storage system comprising a high-end flash-based storage device and a low-end flash-based storage device, generating a time series prediction model using the time series data, generating a write frequency prediction of each data block of the tiered flash-based storage system for a time period describing a future write cycle using the time series prediction model, calculating a cost for maintaining hot data stored on the low-end flash-based storage device and cold data stored on the high-end flash-based storage device, in the tiered flash-based storage system, calculating a cost for migrating the hot data from the low-end flash-based storage device to the high-end flash-based storage device and migrating the cold data of the high-end flash-based storage device to the low-end flash-based storage device wherein the cost for migrating the hot data from the low-end flash-based storage device to the high-end flash-based storage device and migrating the cold data of the high-end flash-based storage device to the low-end flash-based storage device is calculated using a formula: $Cost_{migrate} = Price_{low} + Price_{high} + Price_{low}*Frequency_{hot} + Price_{high}*Frequency_{cold}$, wherein $Price_{low}$ is a cost of the low-end flash-based storage device, $Frequency_{hot}$ is a write frequency of a data block storing the hot data, $Price_{high}$ is a cost of the high-end flash-based storage device and $Frequency_{cold}$ is a write frequency of a data block storing the cold data, determining the cost for migrating the hot data and migrating the cold data is less than the cost for maintaining the hot data and maintaining the cold data, and in response to determining the cost for migrating the hot data and migrating the cold data is less than the cost for maintaining the hot data and maintaining the cold data, migrating the hot data from the low-end flash-based storage device to the high-end flash-based storage device and the cold data from the high-end flash-based storage device to the low-end flash-based storage device.

14. The computer program product of claim 13, wherein the cost for maintaining the hot data on the low-end flash-based storage device and the cold data on the high-end flash-based storage device is calculated using a formula: $Cost_{maintain} = Price_{low}*Frequency_{hot} + Price_{high}*Frequency_{cold}$, wherein $Price_{low}$ is a cost of the low-end flash-based storage device, $Frequency_{hot}$ is a write frequency of a data block storing the hot data, $Price_{high}$ is a cost of the high-end flash-based storage device and $Frequency_{cold}$ is a write frequency of a the data block storing the cold data.

15. The computer program product of claim 13, wherein the computer-implemented method further comprises the steps of:
    marking the hot data on each data block to stage for migration from the low-end flash-based storage device to the high-end flash-based storage device; and
    marking the cold data on each data block to de-stage for migration from the high-end flash-based storage device to the low-end flash-based storage device.

16. The computer program product of claim 13 wherein the computer-implemented method further comprises the steps of:
    identifying a time period wherein the tiered flash-based storage system experiences a peak rate of change in write frequency of each data block;
    selecting cold point in time prior to the peak rate of change in write frequency of each data block wherein the tiered flash-based storage system experiences minimal changes in the write frequency; and
    performing the migrating step during the cold point in time.

17. The computer program product of claim 13, wherein the high-end flash-based storage device is single-level cell (SLC) solid state drive (SSD) and the low-end flash-based storage device is an SSD selected from the group consisting a multi-level cell (MLC) SSD, a triple-level cell (TLC) SSD and a combination thereof.

* * * * *